United States Patent
Claessens et al.

(10) Patent No.: US 9,709,766 B2
(45) Date of Patent: Jul. 18, 2017

(54) CABLE MANAGEMENT SYSTEM INCLUDING SPLITTER/FILTER TRAY

(71) Applicants: TYCO ELECTRONICS RAYCHEM BVBA, Kessel-Lo (BE); ADC CZECH REPUBLIC S.R.O., Brno (CZ); TYCO ELECTRONICS RAYCHEM GMBH, Ottobrunn (DE)

(72) Inventors: Bart Mattie Claessens, Hasselt (BE); Dirk Kempeneers, Aarschot (BE); Wouter Foulon, Leuven (BE); Eric Lydia Paul Peeters, Heverlee (BE); Koen Huybrechts, Heverlee (BE); Stepan Sejbal, Stare Mesto (CZ); Thomas Lehnert, Olching (DE)

(73) Assignees: CommScope Connectivity Belgium BVBA, Kessel-Lo (BE); ADC CZECH REPUBLIC S.R.O., Brno (CZ); CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/413,963

(22) PCT Filed: Jul. 4, 2013

(86) PCT No.: PCT/EP2013/064175
§ 371 (c)(1),
(2) Date: Jan. 9, 2015

(87) PCT Pub. No.: WO2014/009255
PCT Pub. Date: Jan. 16, 2014

(65) Prior Publication Data
US 2015/0205064 A1 Jul. 23, 2015

Related U.S. Application Data

(60) Provisional application No. 61/669,513, filed on Jul. 9, 2012, provisional application No. 61/791,206, filed on Mar. 15, 2013.

(51) Int. Cl.
*G02B 6/00* (2006.01)
*G02B 6/44* (2006.01)
(Continued)

(52) U.S. Cl.
CPC ............ *G02B 6/4455* (2013.01); *B32B 37/12* (2013.01); *B32B 37/18* (2013.01); *G02B 6/4453* (2013.01);
(Continued)

(58) Field of Classification Search
CPC .................................................. G02B 6/4455
See application file for complete search history.

(56) References Cited

U.S. PATENT DOCUMENTS 5,553,183 A * 9/1996 Bechamps ........... G02B 6/4454
385/135
5,689,605 A * 11/1997 Cobb ................... G02B 6/4454
385/135
(Continued)

FOREIGN PATENT DOCUMENTS

EP 1 852 722 11/2007
EP 2 490 059 B1 6/2014

OTHER PUBLICATIONS

International Search Report for International Application No. PCT/EP2013/064175 mailed Sep. 13, 2013 (2 pages).

*Primary Examiner* — Uyen Chau N Le
*Assistant Examiner* — Chad Smith
(74) *Attorney, Agent, or Firm* — Merchant & Gould P.C.

(57) ABSTRACT

A two layer splitter tray (18) has a cover (32) which mounts to a base (34). The base (34) and the cover (32) define openings for one or more splitters (88). The base (34) and cover (32) include cable management devices (42, 64) for managing the cable and fiber inputs and outputs, and the splices. Further splice trays (16) can be used with the splitter (Continued)

tray (18) for splicing to the splitter outputs. Other trays (100, 200) include a partial cover (140, 240) and openings for optical components and for adhesive attachment of parts.

20 Claims, 31 Drawing Sheets

(51) Int. Cl.
    *B32B 37/12*     (2006.01)
    *B32B 37/18*     (2006.01)

(52) U.S. Cl.
    CPC ..... *B32B 2307/412* (2013.01); *B32B 2551/00* (2013.01); *Y10T 156/10* (2015.01)

(56) References Cited

U.S. PATENT DOCUMENTS

| | | | | |
|---|---|---|---|---|
| 6,343,761 | B1 * | 2/2002 | Talamini, Sr. | G02B 6/4457 242/388 |
| 7,418,184 | B1 * | 8/2008 | Gonzales | G02B 6/4471 385/134 |
| 7,636,507 | B2 * | 12/2009 | Lu | G02B 6/3825 385/135 |
| 8,346,043 | B2 * | 1/2013 | Baum | G02B 6/4454 385/134 |
| 2010/0061693 | A1 | 3/2010 | de Leon et al. | |
| 2011/0268415 | A1 * | 11/2011 | Fabrykowski | G02B 6/4471 385/135 |

* cited by examiner

FIG. 12
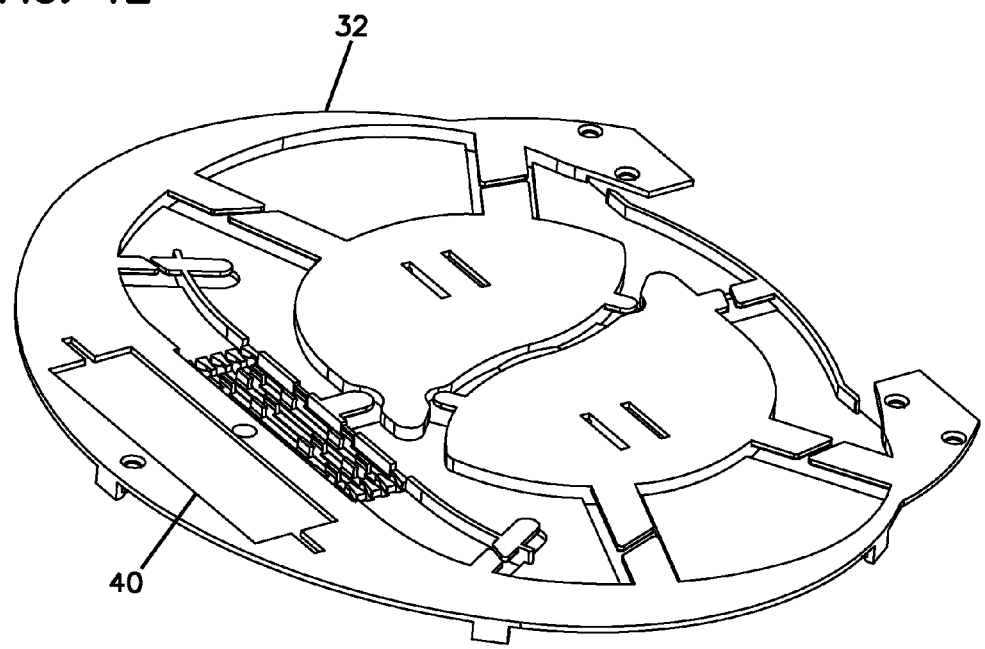
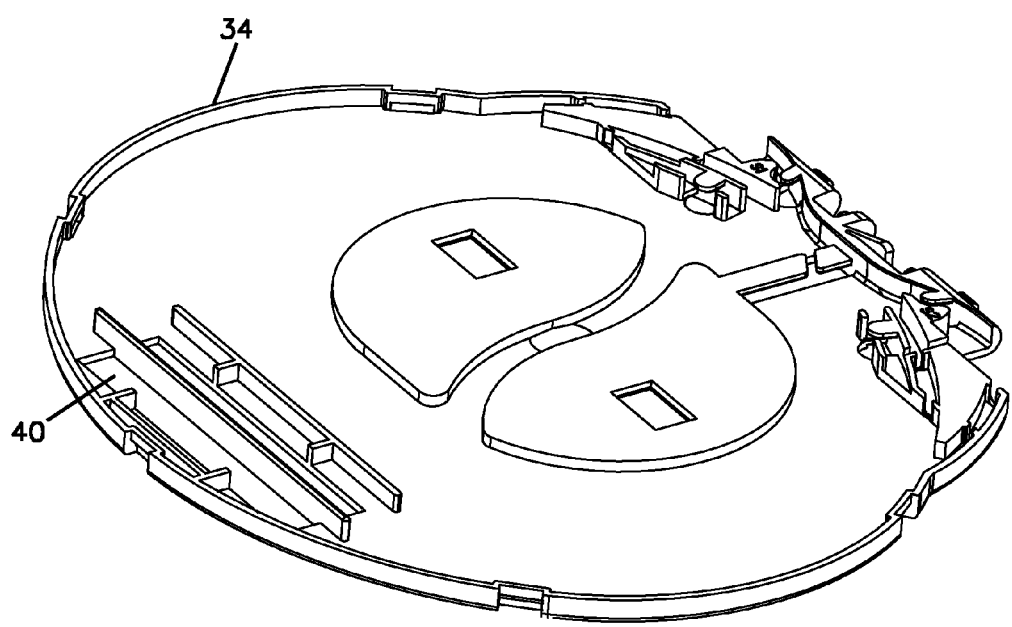

CABLE MANAGEMENT SYSTEM INCLUDING SPLITTER/FILTER TRAY

This application is a National Stage Application of PCT/EP2013/064175, filed 4 Jul. 2013, which claims benefit of U.S. Provisional Ser. No. 61/699,513, filed 9 Jul. 2012 and U.S. Provisional Ser. No. 61/791,206, filed 15 Mar. 2013 and which applications are incorporated herein by reference. To the extent appropriate, a claim of priority is made to each of the above disclosed applications.

BACKGROUND

The present invention relates to the management of optical fiber connections and in particular concerns optical fiber organizers including fiber trays.

An optical fiber organizer typically comprises optical fiber storage trays. The trays include various cable and fiber guides, and various guide walls and retaining tabs are provided for guiding incoming and outgoing fibers and cables to and from an organizer assembly. The trays are mounted on the support side by side in a one dimensional array in pivotal mounts. A cable with an optical fiber is fixed to the support and the fiber is guided to the respective tray. The tray includes a fixing arrangement for fixing optical fiber splices.

SUMMARY

Low profile splitter or filter trays are provided in which recesses and/or openings are provided in the tray base and/or the tray cover to fit over components on the tray without adding additional thickness to the tray.

In one system, a fiber organizer includes a plurality of splice trays, and a separate splitter tray for storing the splitter and splicing the input towards the splitter in a demarcation area. Splitter outputs are routed on the splice trays by additional tray inlets. The splitter can be fixed on the tray with an open fixation area.

The splitter tray is a two layer tray with only the top layer to be accessible to the installer. On the bottom of the splitter tray one or more the splitters are fixed and the splitter input is routed to the top layer of the splitter tray. On the bottom layer the splitter outputs are routed through the additional side entrance and fed through a hole in the support or groove plate. At the back of the groove plate the splitter outputs are divided toward the splice trays through further holes in the groove plate. On the splice trays, the splitter outputs are routed into the additional side entrance and fixed in this entrance port.

The splitter housing can be fixed wherein the splitter tray does not have a top and bottom covering, and the splitter is affixed to sidewalls in an opening. Alternatively, the splitter can be positioned in an unpacked state and top and bottom planes can be created. The present splitter tray is advantageous over separate splitter and splitter input splice trays, or locating the splitter in an area not on a tray.

The splitter tray is flexible allowing multiple cable routing configurations.

The splice trays are flexible allowing multiple cable routing configurations.

Additional trays are disclosed with recesses or openings in one or both of a tray base and a tray cover to receive a component, such as a splice or a filter. The cover only covers a portion of the tray in some embodiments. Fiber fixation areas are located under the cover in some embodiments.

BRIEF DESCRIPTION OF THE DRAWINGS

FIG. 12 is a top perspective view of the splitter tray with the cover separated from the base;

DETAILED DESCRIPTION

Figure 1:
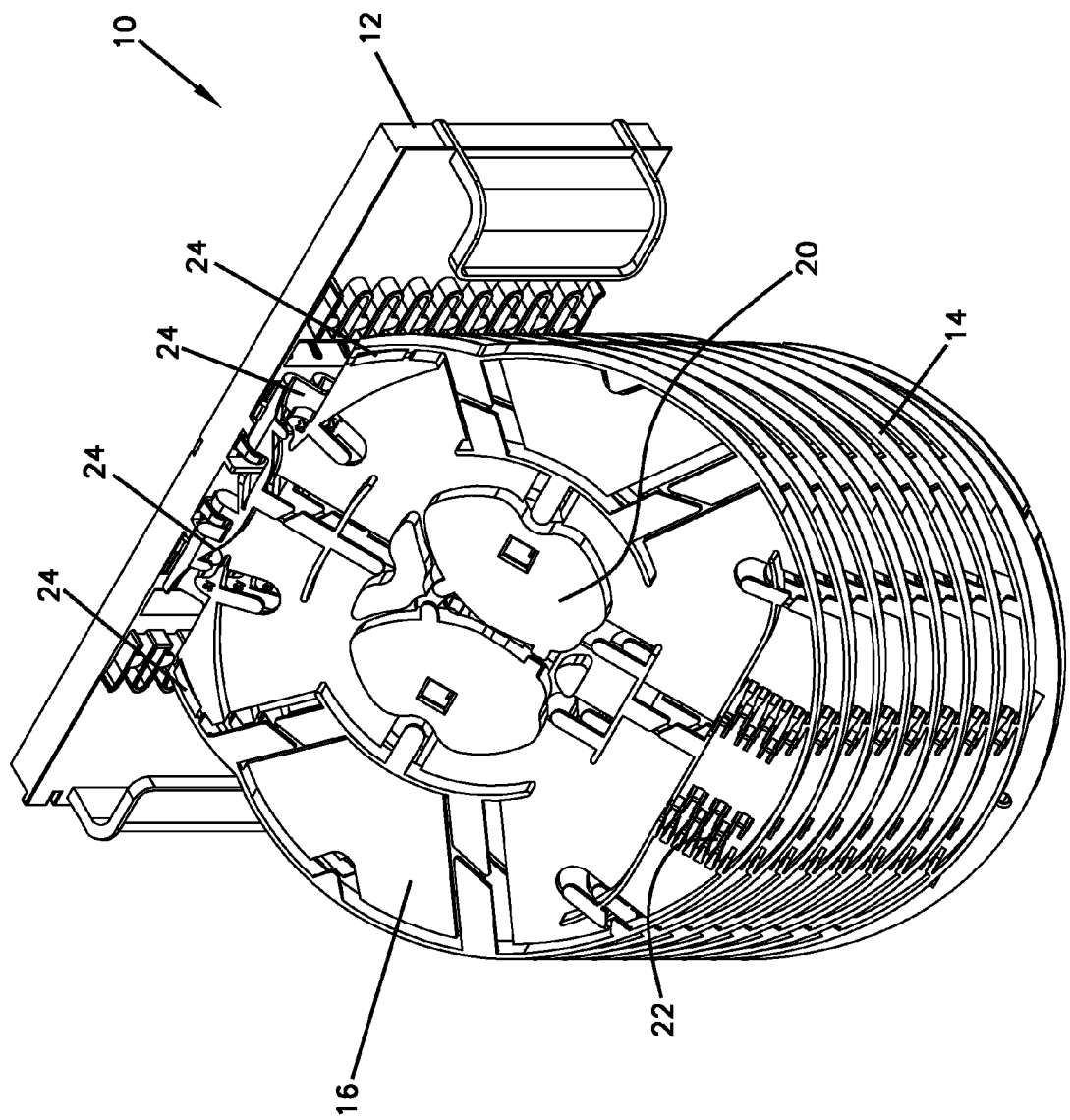
FIG. 1 is a top perspective view of an organizer including a plurality of splice trays with a lower tray including splitter and splice functions.
Figure 2:
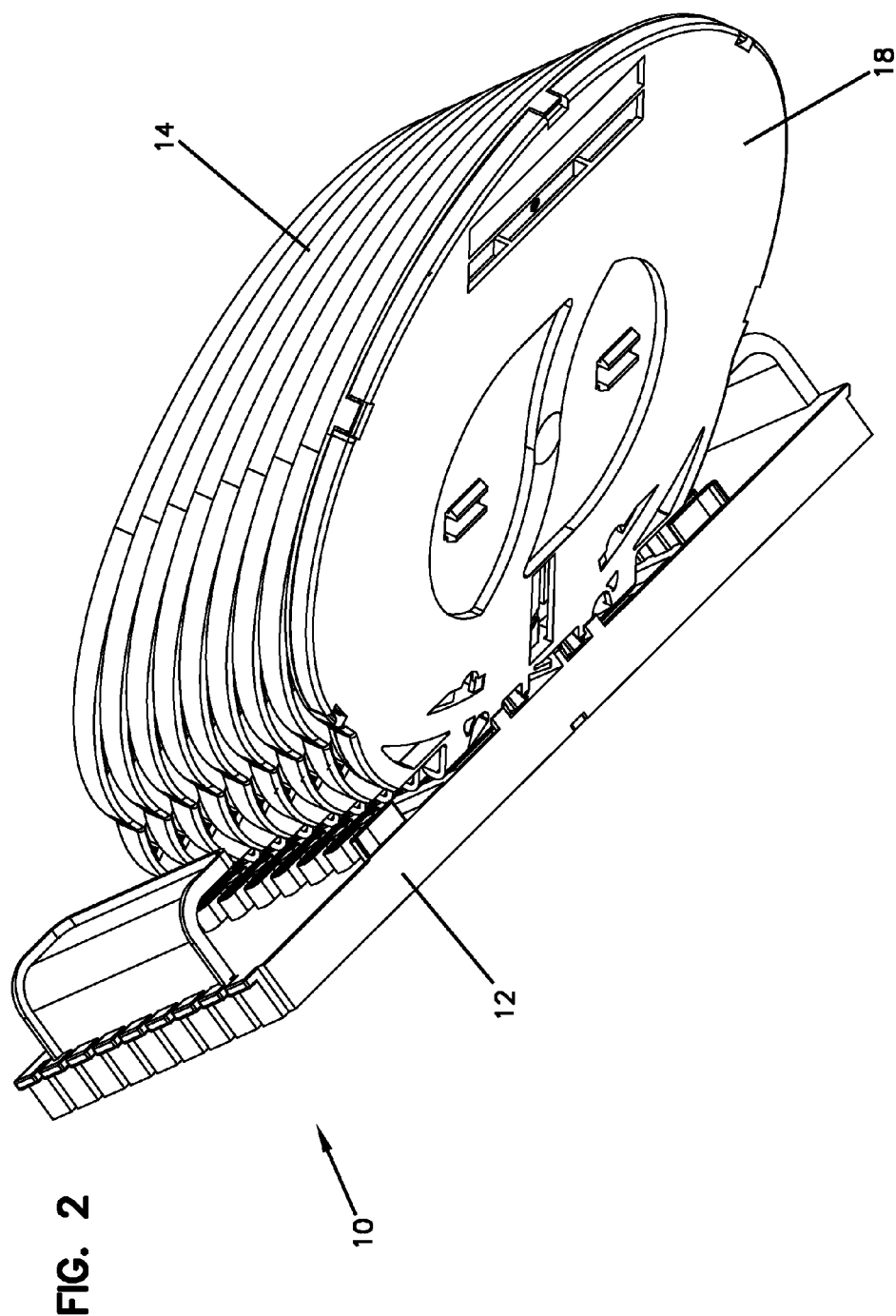
FIG. 2 is a bottom perspective view of the organizer of FIG. 1.
Figure 3:
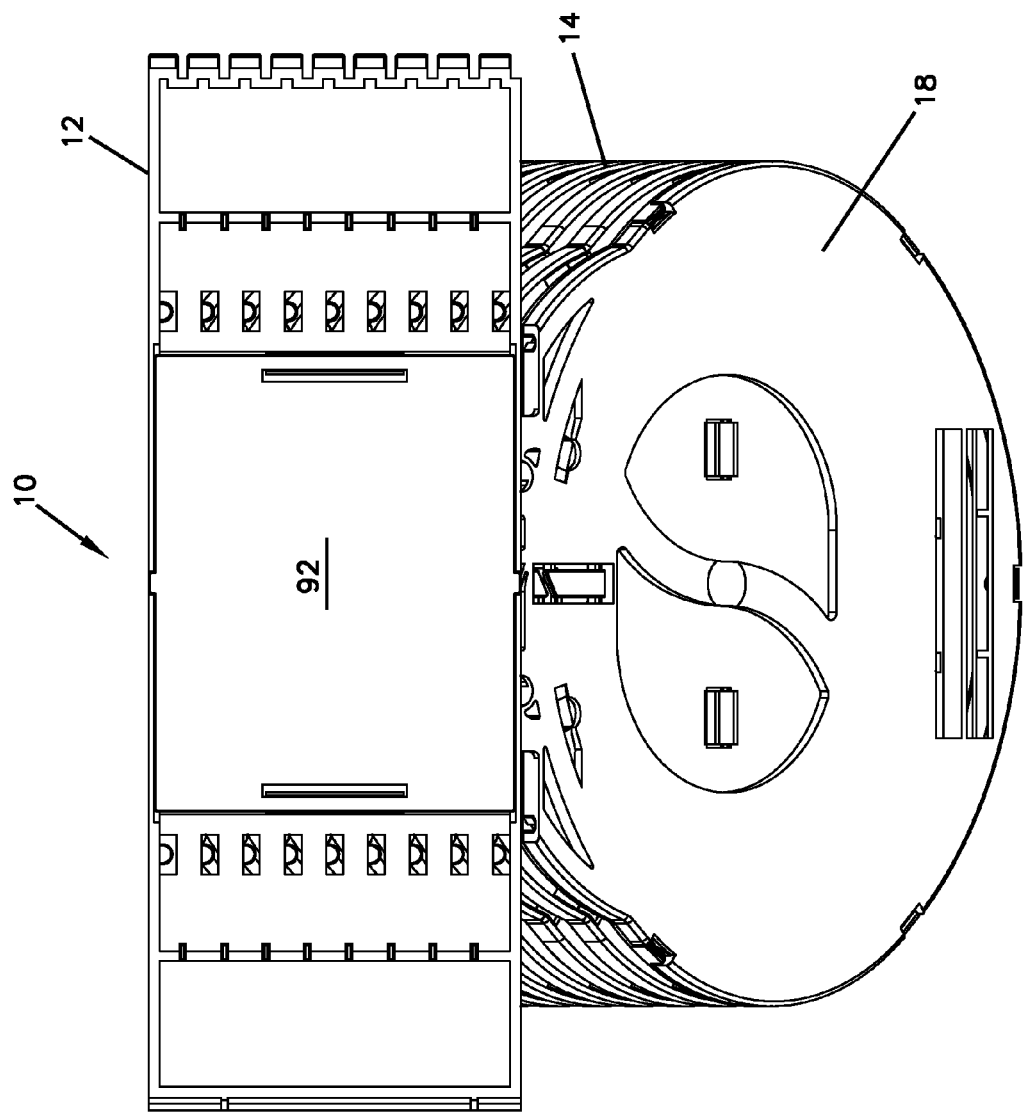
FIG. 3 is a rear view of the organizer of FIG. 1.
Figure 4:
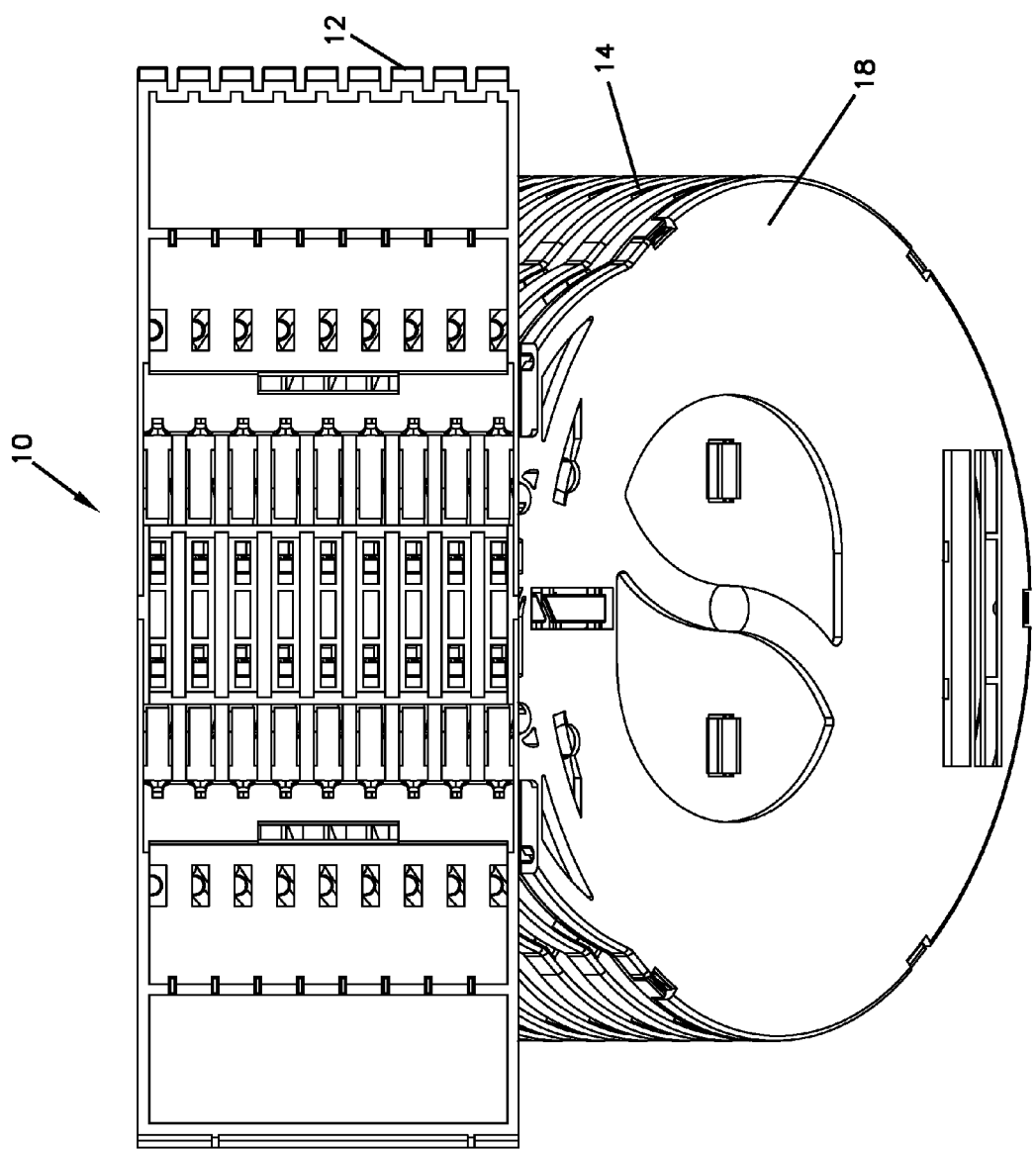
FIG. 4 is a rear view of the organizer of FIG. 3 without the cover.
Figure 5:
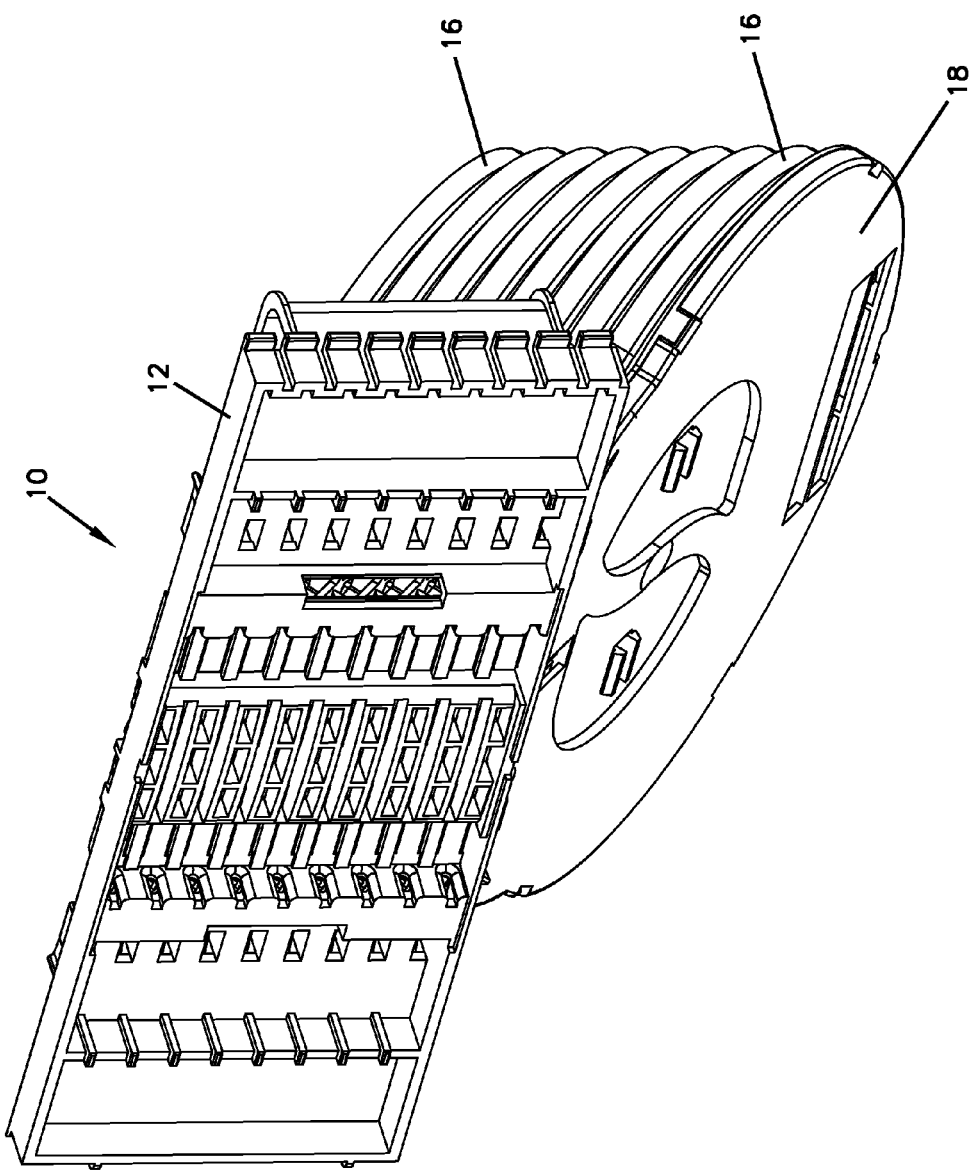
FIG. 5 is a perspective view of the organizer of FIG. 4.
Figure 6:
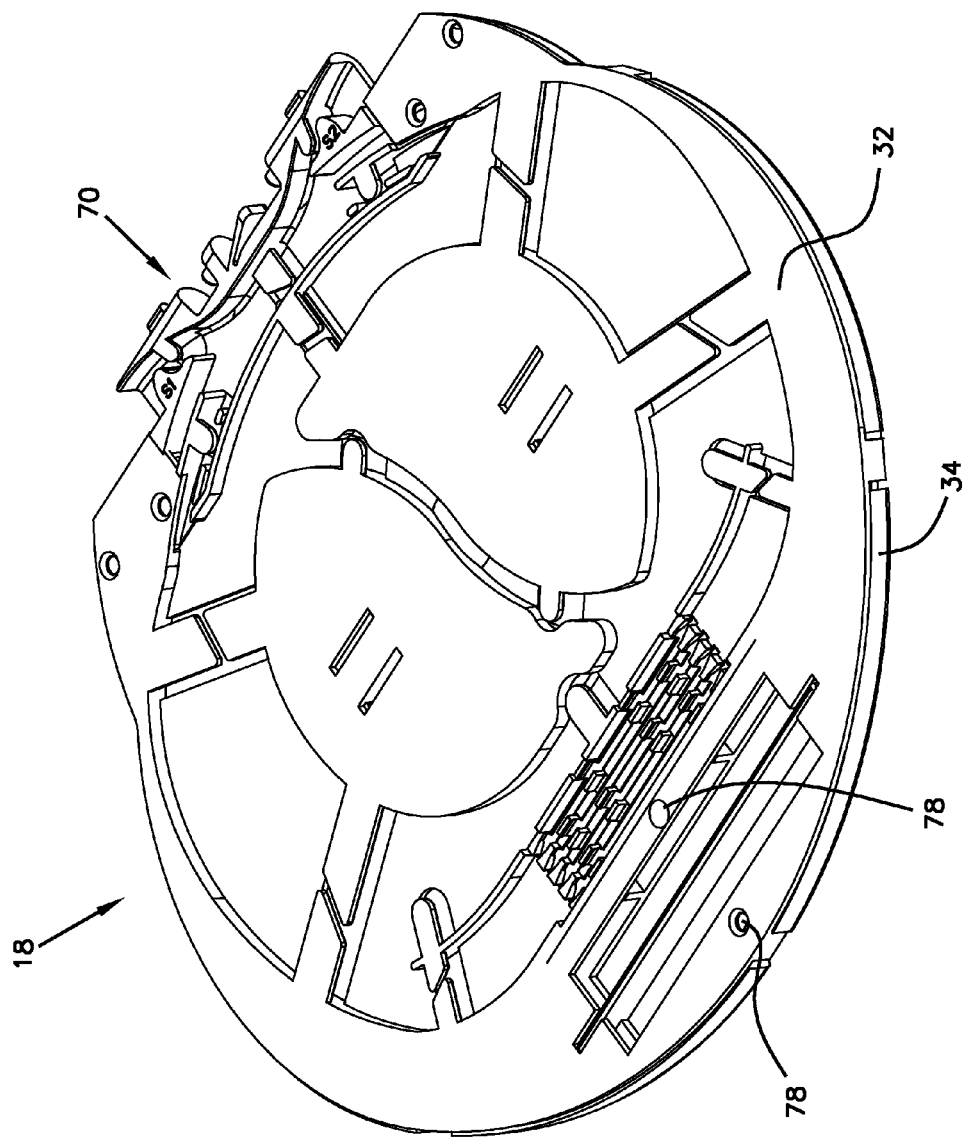
FIG. 6 is a top perspective view of the splitter tray.
Figure 7:
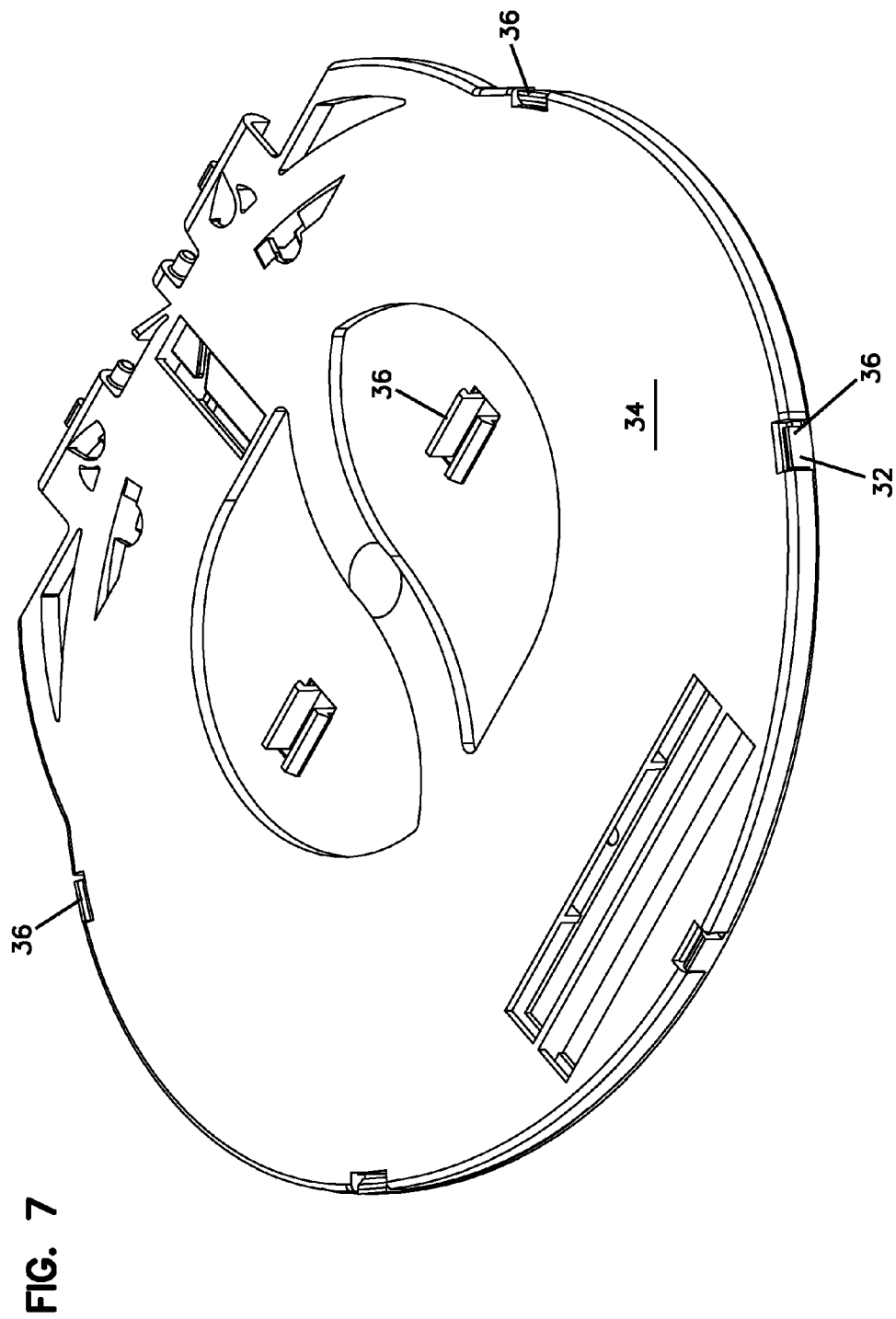
FIG. 7 is a bottom perspective view of the splitter tray.
Figure 8:
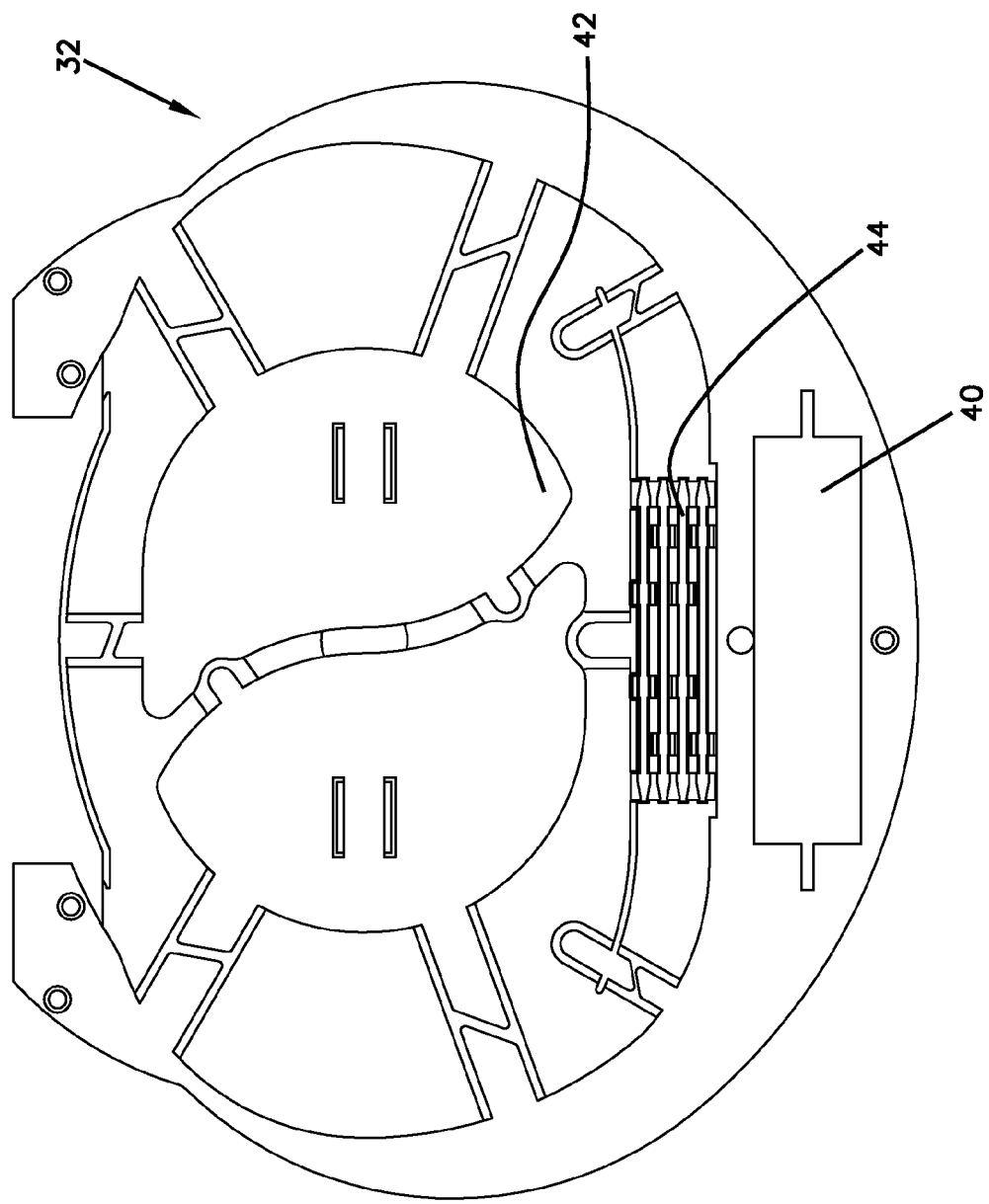
FIG. 8 is a top view of the cover of the splitter tray.
Figure 9:
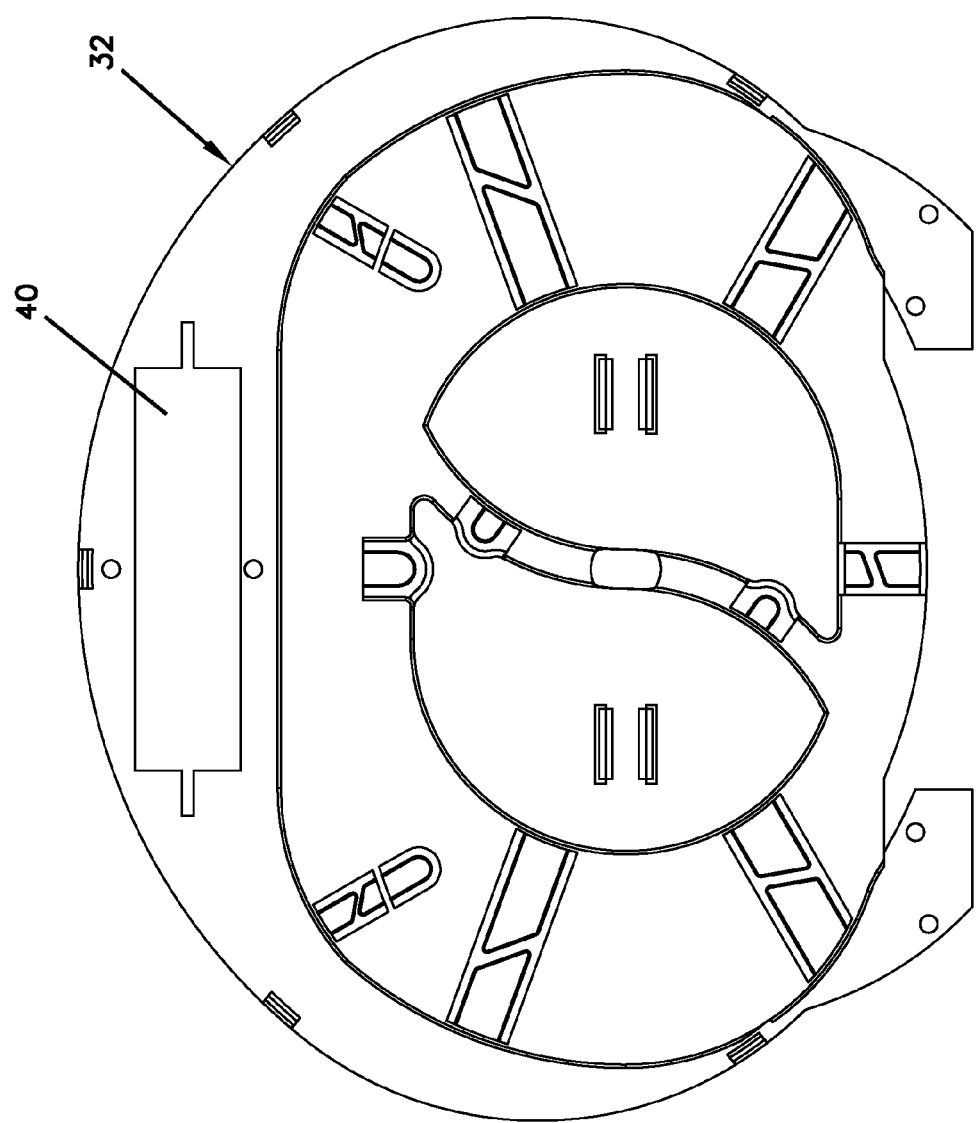
FIG. 9 is a bottom view of the cover of FIG. 5.
Figure 10:
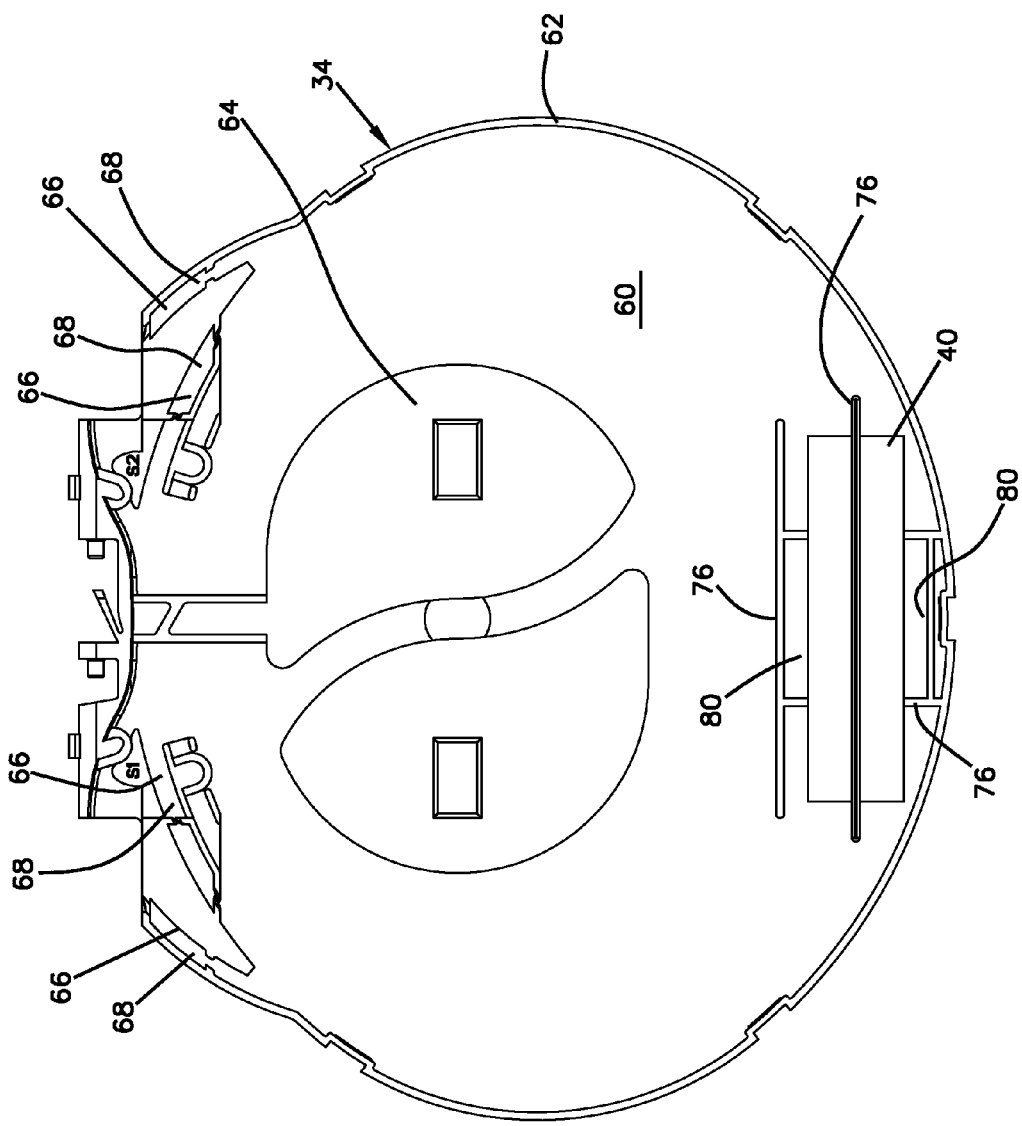
FIG. 10 is a top view of the base of the splitter tray.
Figure 11:
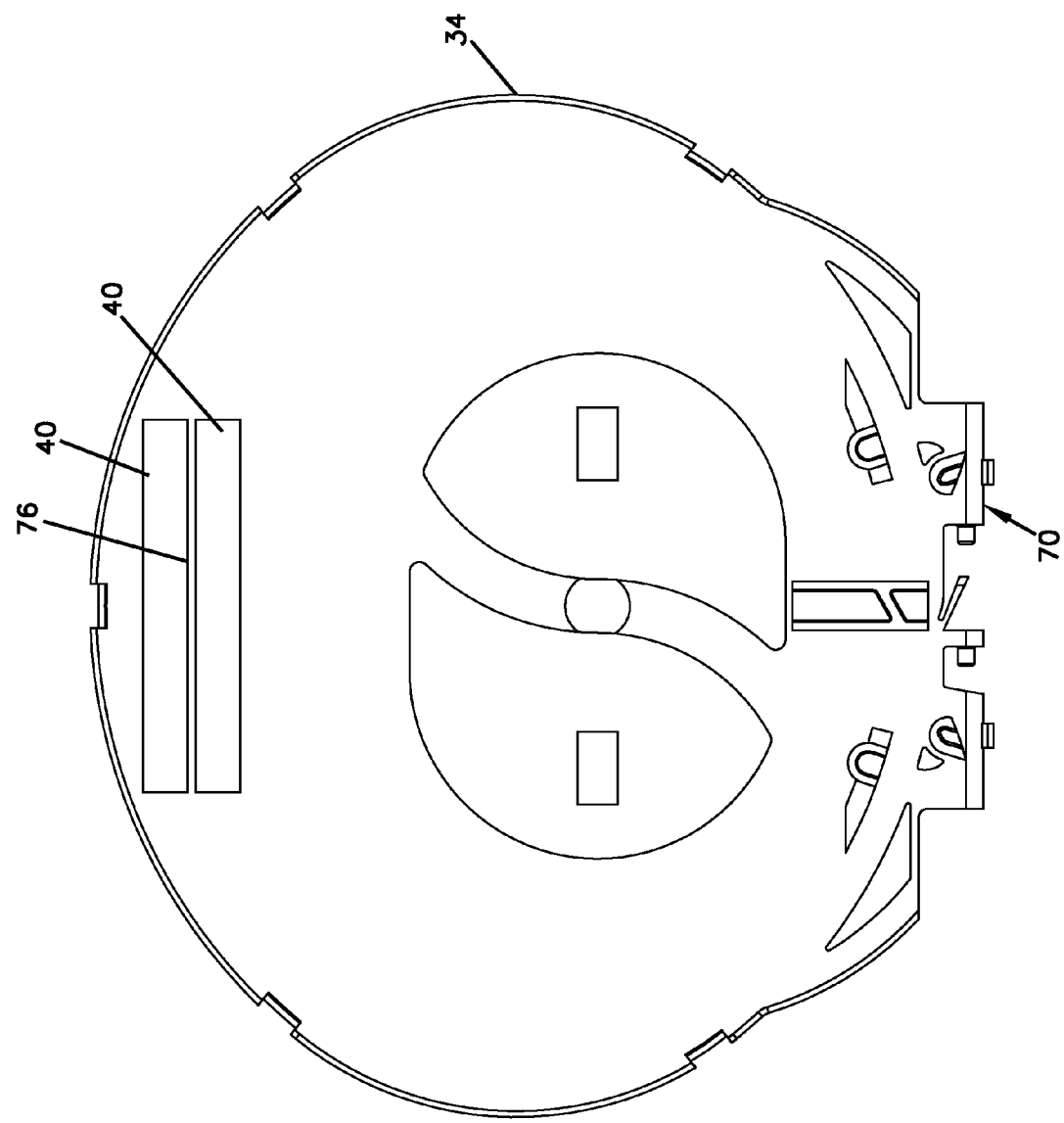
FIG. 11 is a bottom view of the base of FIG. 10.
Figure 13:
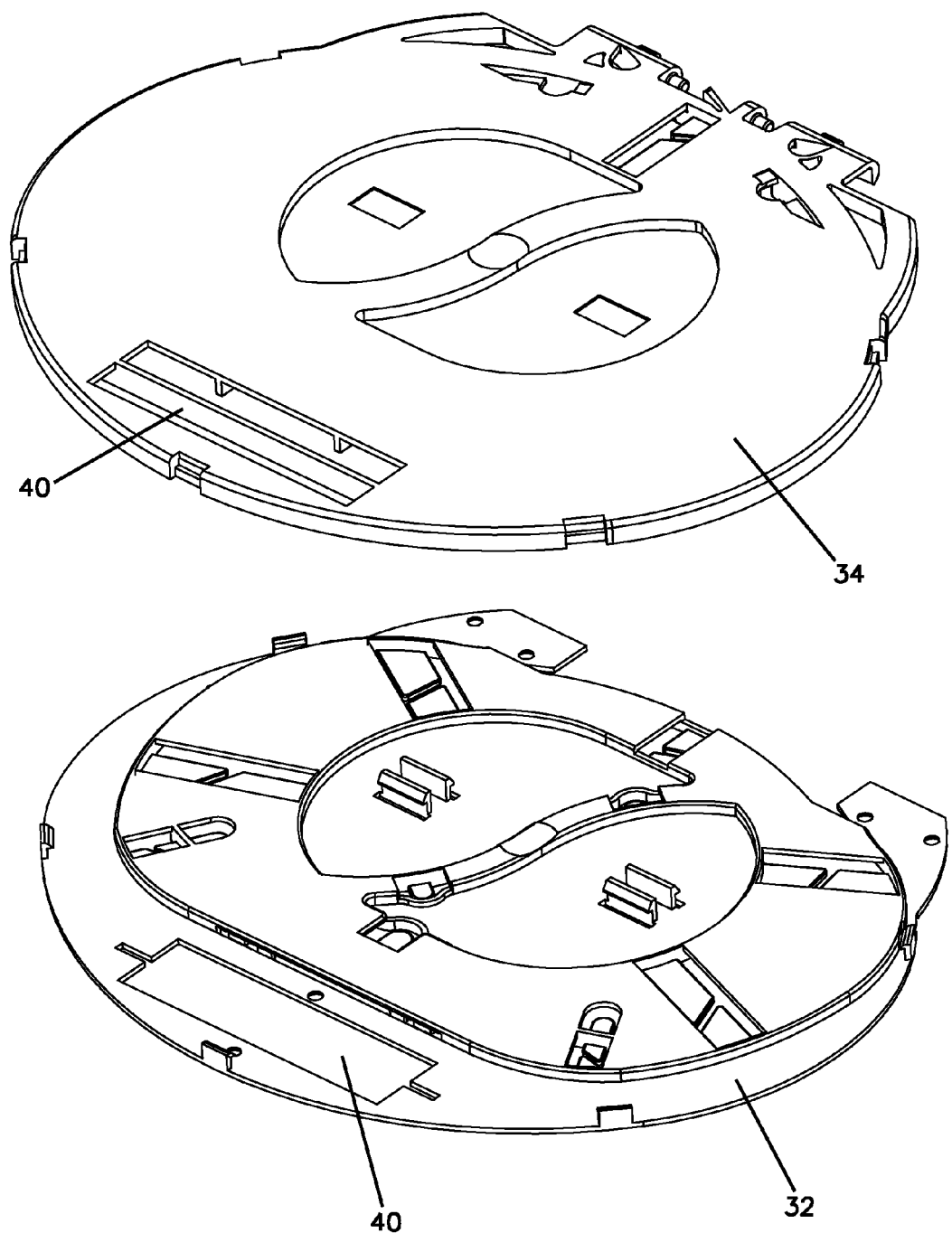
FIG. 13 is a bottom perspective view of the splitter tray with the cover separated from the base.

Referring now to the figures, organizer 10 includes a support plate 12. Support plate 12 pivotally mounts plurality of trays 14. Upper trays 16 are splice trays. A lower tray 18 is a splitter tray. The trays 14 are pivotally mounted to allow selective access to a desired tray by a technician.

Splice trays 16 include areas for cable routing including various cable management devices 20 and splice holders 22. Entrances and exits 26 are provided on each splice tray 16.

Referring now to FIGS. 6-13, splitter tray 18 includes a cover 32 and a base 34. Cover 32 snaps to base 34 with snaps 36. Openings 40 define splitter mounting locations. In one implementation, splitter mounting locations 40 are completely open from a top to a bottom of splitter tray 18. Cover 32 further includes cable management devices 42 for managing cables or fibers. Cover 32 also includes splice holders 44. Cover 32 further defines entrances exits 46. Base 34 includes a lower support surface 60 and an outer rim 62.

Figure 14:
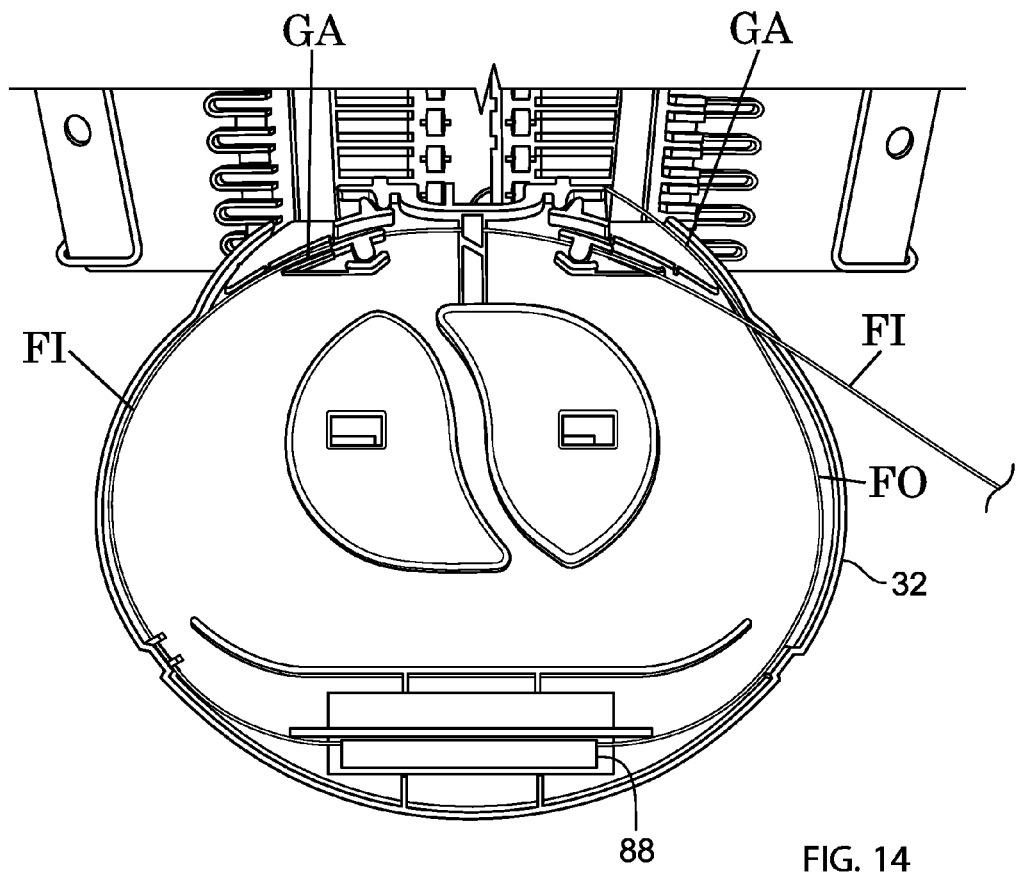
FIGS. 14-21 show various cable routings on the splitter tray and the splice tray.

Base 34 includes cable management devices 64 for managing cables and fibers. Base 34 also includes entrances and exits 66. Cover 32 further defines the hinge elements 70 for hingedly mounting splitter tray 18 to support plate 12. Adjacent to splitter mounting locations 40, base 34 includes a plurality of ribs 76. Adjacent to ribs 76 are two openings 78 in cover 32. In use, input fibers and output fibers are brought to base 34 and glued at the entrance and exit locations 66. Adhesive can be inserted through openings 78 to hold the splitters 88 (FIG. 14). Splitter 88 is positioned in one of the splitter mounting locations 40. As shown, two splitters 88 can be provided. Each splitter 88 can be affixed with tape and/or potted with glue in glue areas 80.

Various cable routing possibilities are provided the splitter input can be glued at one entrance, and the splitter outputs can be glued at one of the exits on an opposite side of base 34. Glue areas 68 are provided on base 34. The outputs can pass through the support plate for entry adjacent to a desired splice tray. Cover 32 can include input slack and a splice for splicing to an input cable.

A further option is to glue the inputs and the outputs on opposite sides of the cover 32 and route the input slack on cover 32 in an opposite direction toward splice holders 22. The outputs would pass through alternative openings in support plate 12 for passage to the splice trays 16.

A third option is that the inputs and outputs are affixed on the same side of cover 32 and the cable management devices 64 reroute one or the other of the inputs and outputs to allow for passage to a splitter. Cover 32 is used to manage slack for the input cable.

Figure 15:
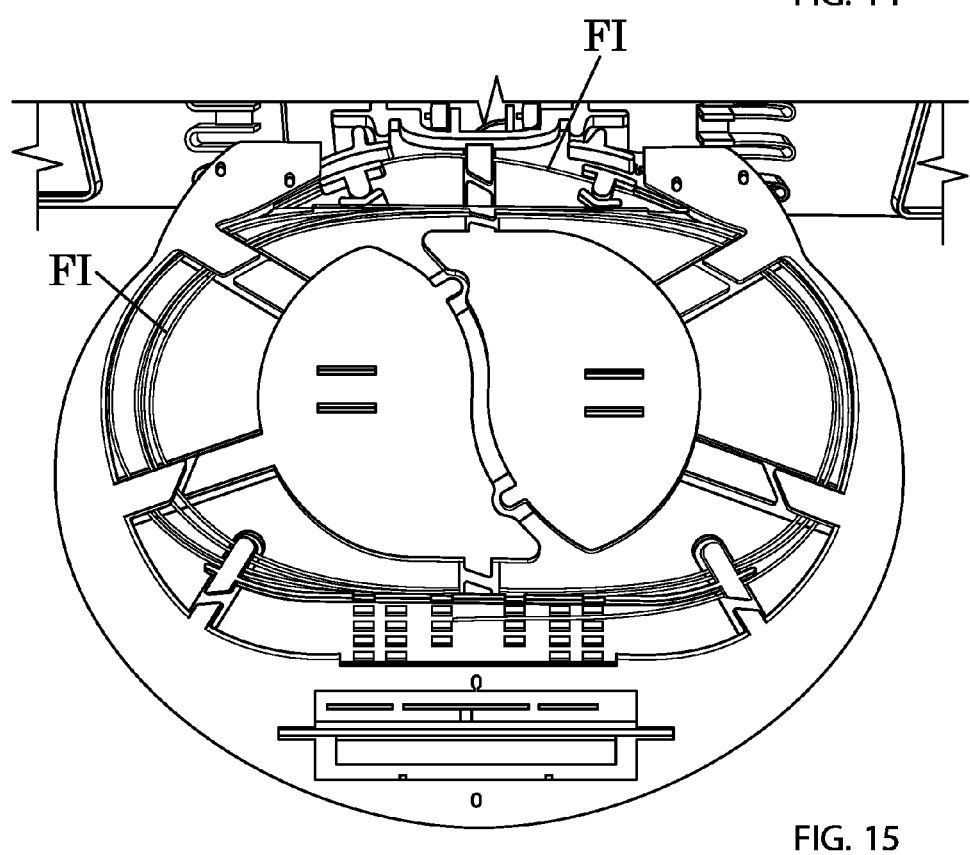
Figure 16:
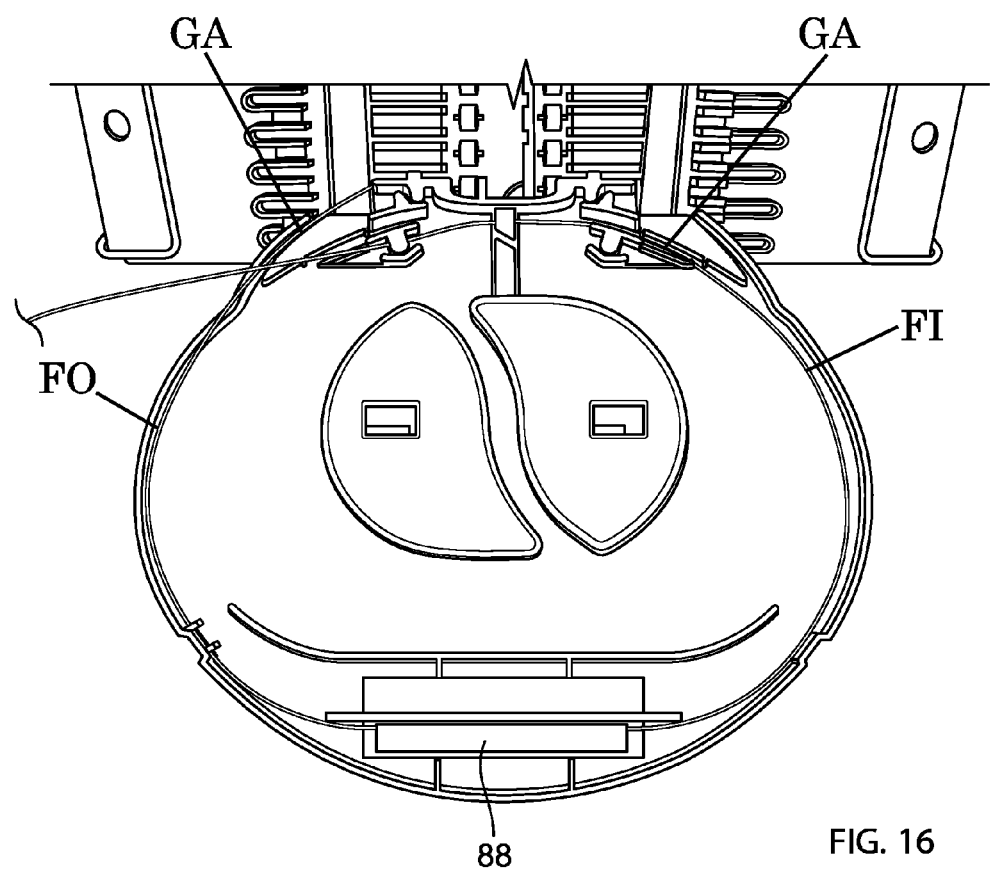
Figure 17:
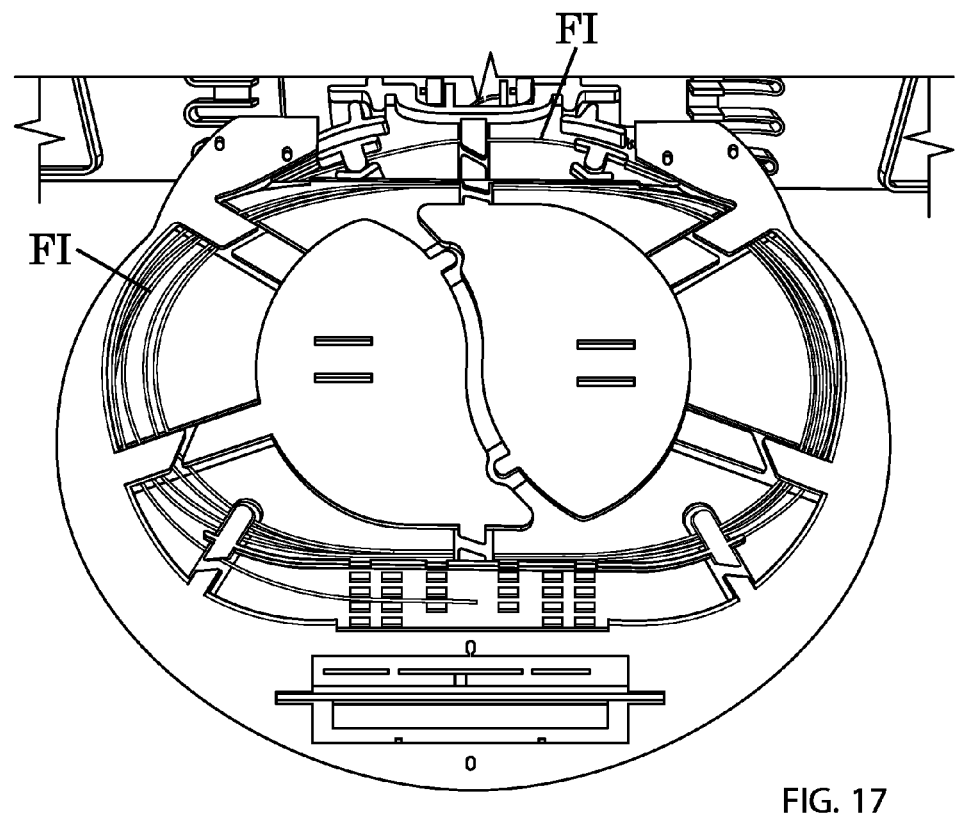
Figure 18:
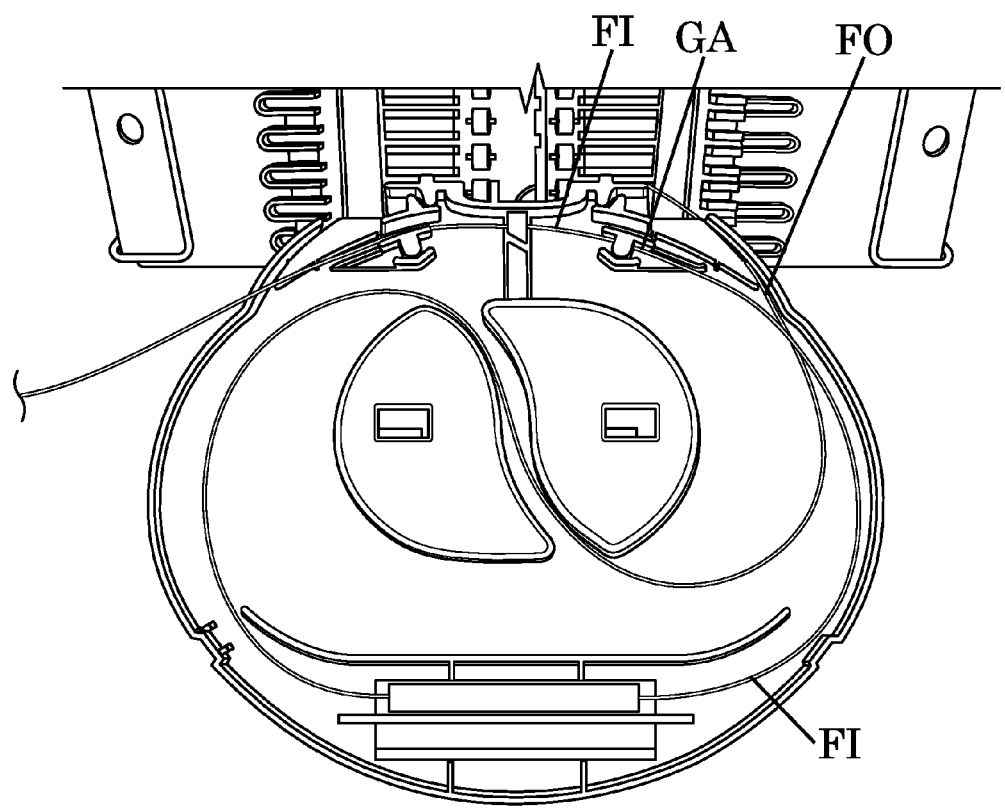
Figure 19:
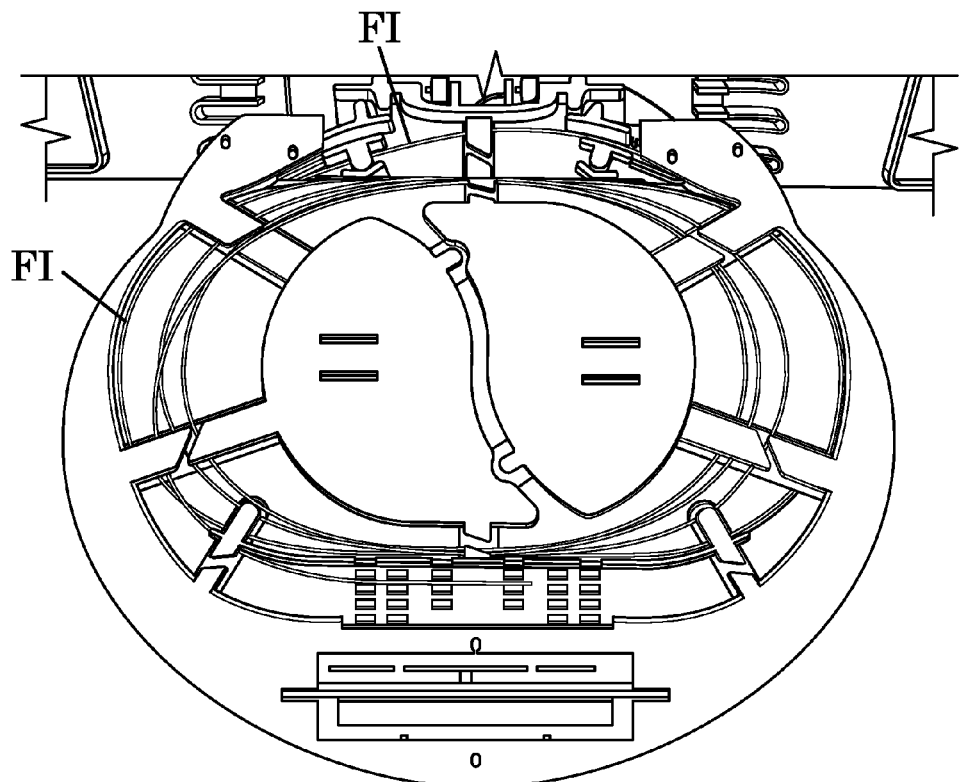

FIGS. 14 and 15 show one fiber routing option. FIGS. 16 and 17 show another fiber routing option. FIGS. 18 and 19 show another fiber routing option.

FIGS. 14 and 15 show a fiber input from the splice to the splitter FI, and a fiber output(s) from the splitter FO. FIGS. 14 and 15 also show glue areas GA for the fibers.

FIGS. 16 and 17 show an alternative arrangement for the glue areas GA, fiber input FI, and fiber output FO.

FIGS. 18 and 19 show an alternative arrangement for the glue areas GA, fiber input FI, and fiber output FO.

A rear of support plate 12 can be provided with a cover 92 which can be affixed in place with snaps, adhesive, or a security label. The output fibers can be directed to the splice trays through openings 90 and can be glued to each splice tray at the entrance area.

Figure 20:
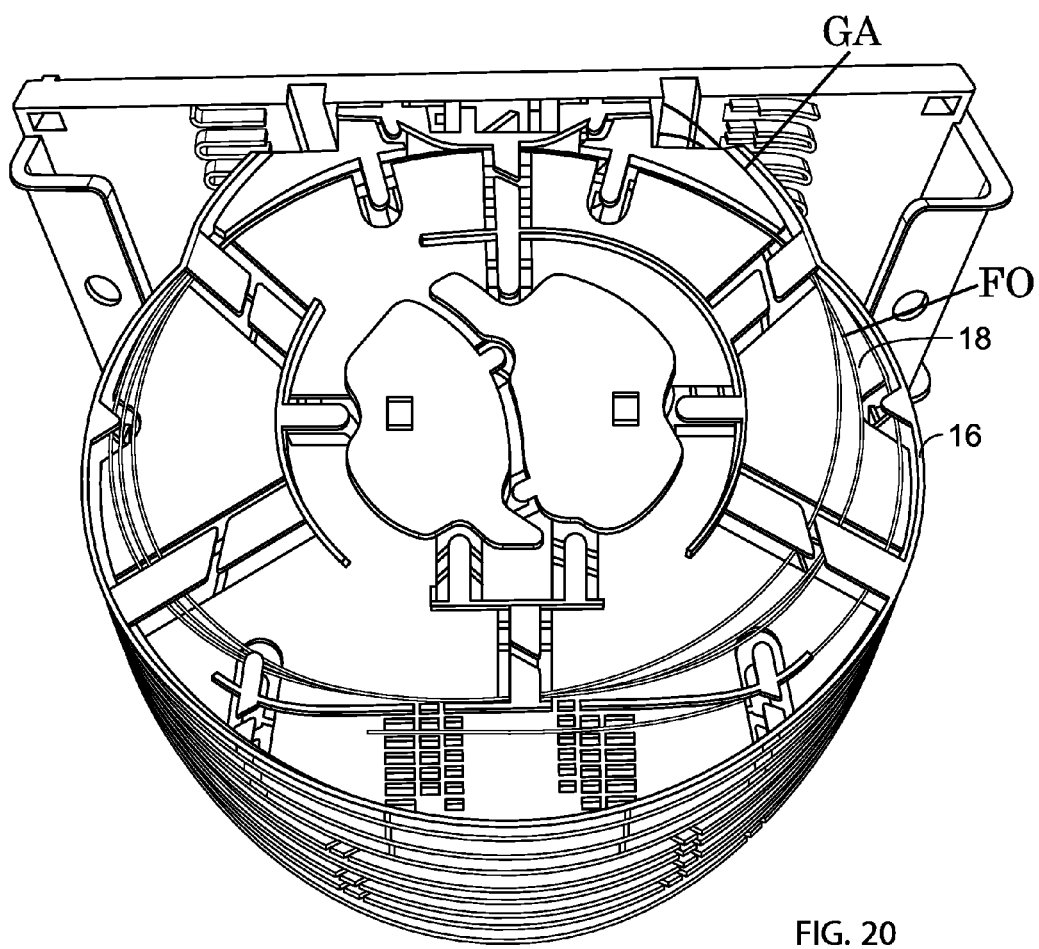
Figure 21:
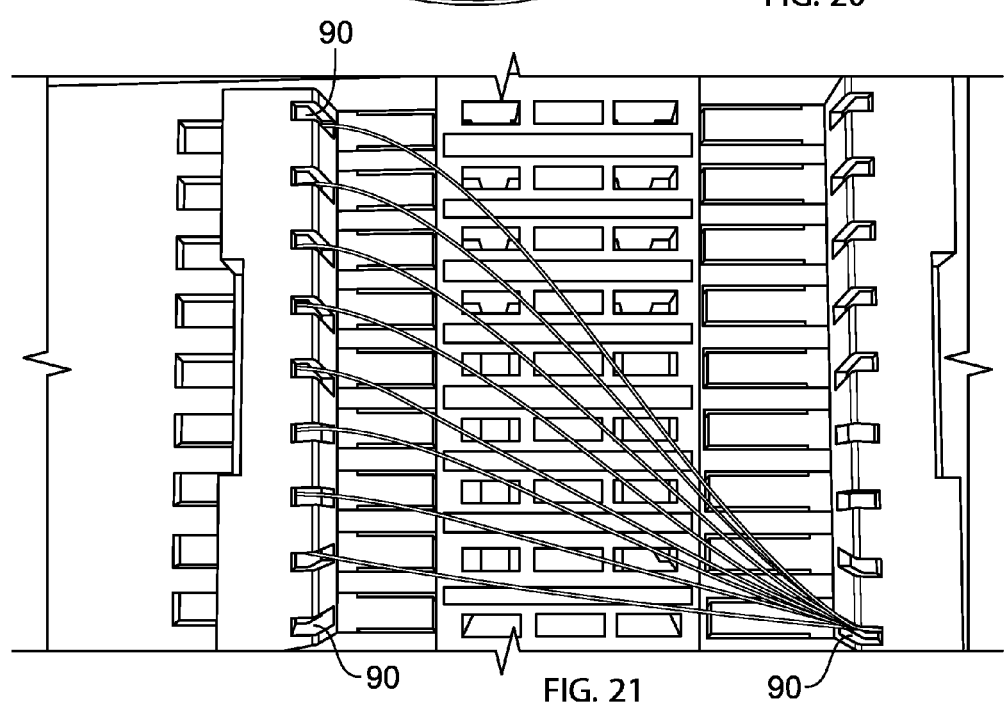
Figure 22:
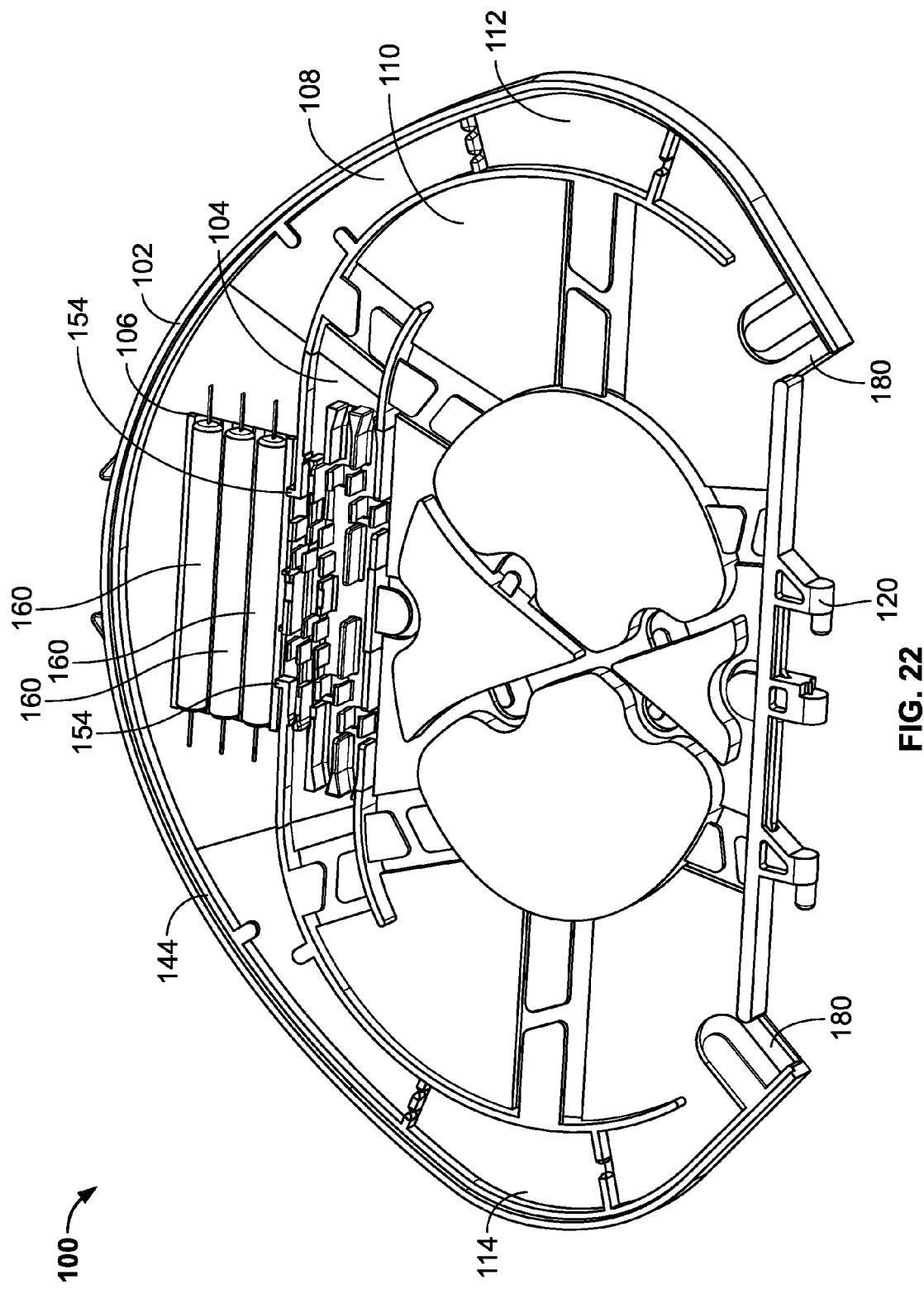
FIG. 22 is a top perspective view of an embodiment of a filter tray, shown without the cover.
Figure 23:
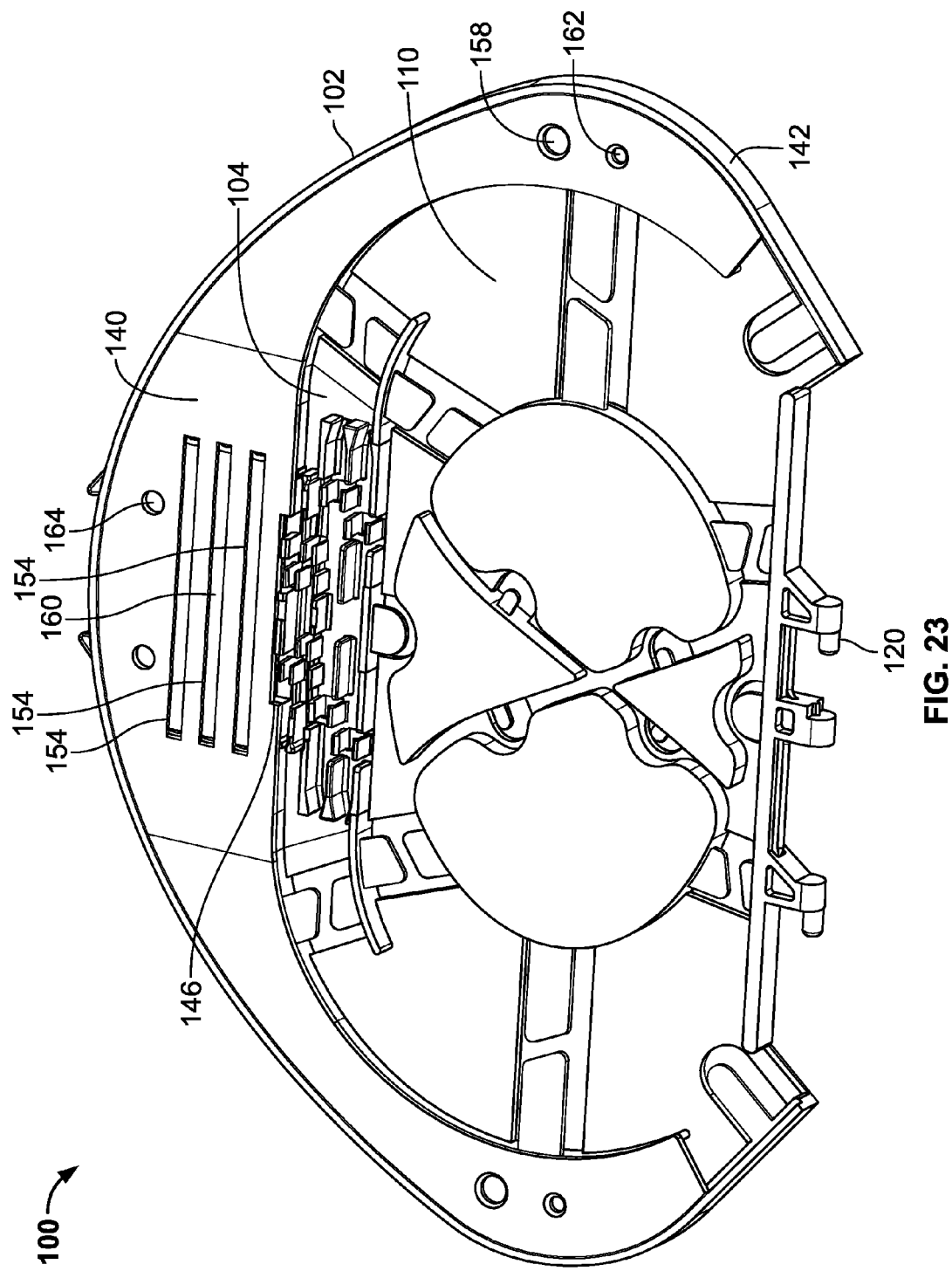
FIG. 23 shows the tray of FIG. 22, including the cover.
Figure 24:
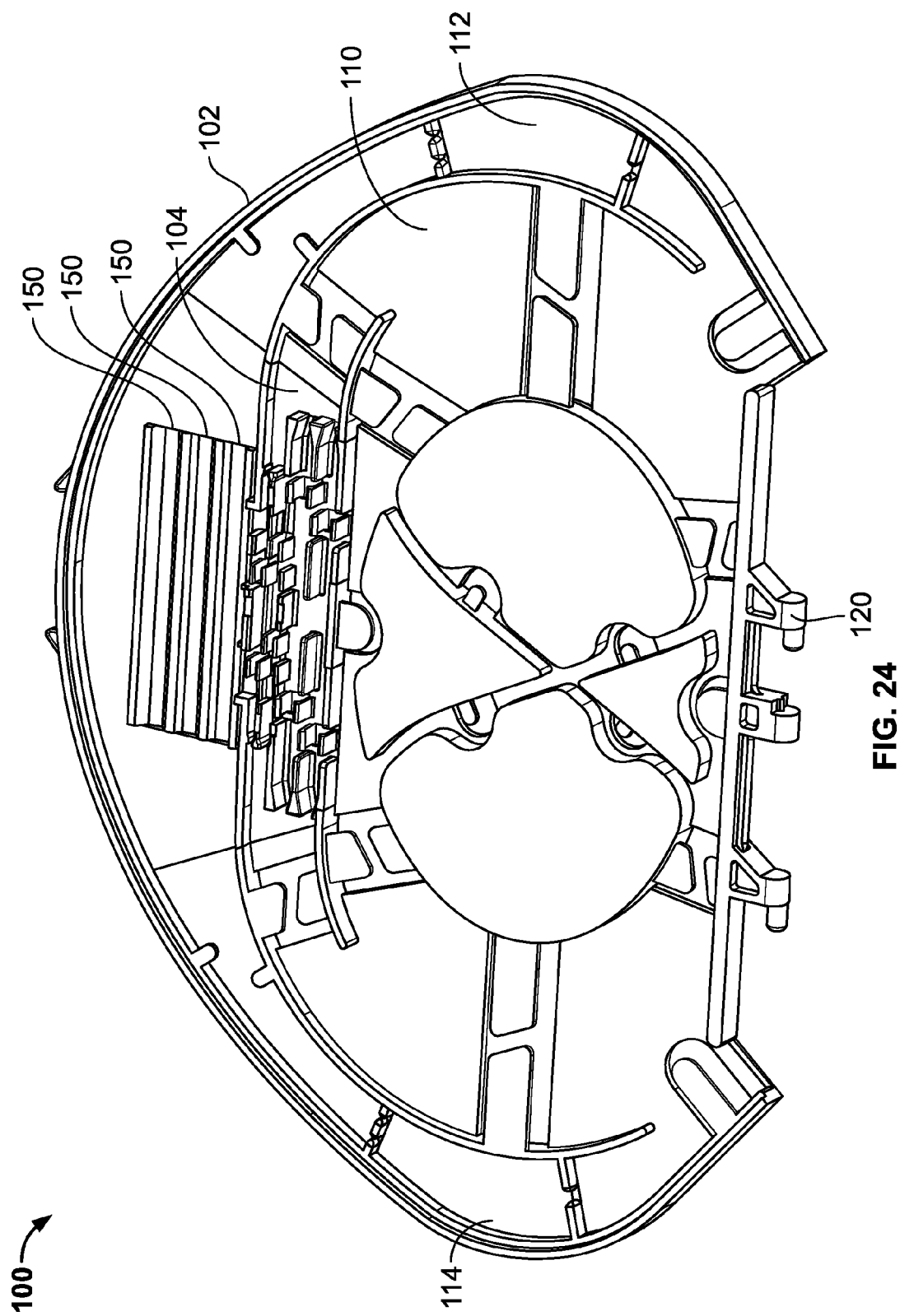
FIG. 24 shows the tray of FIG. 22 without the filters.
Figure 25:
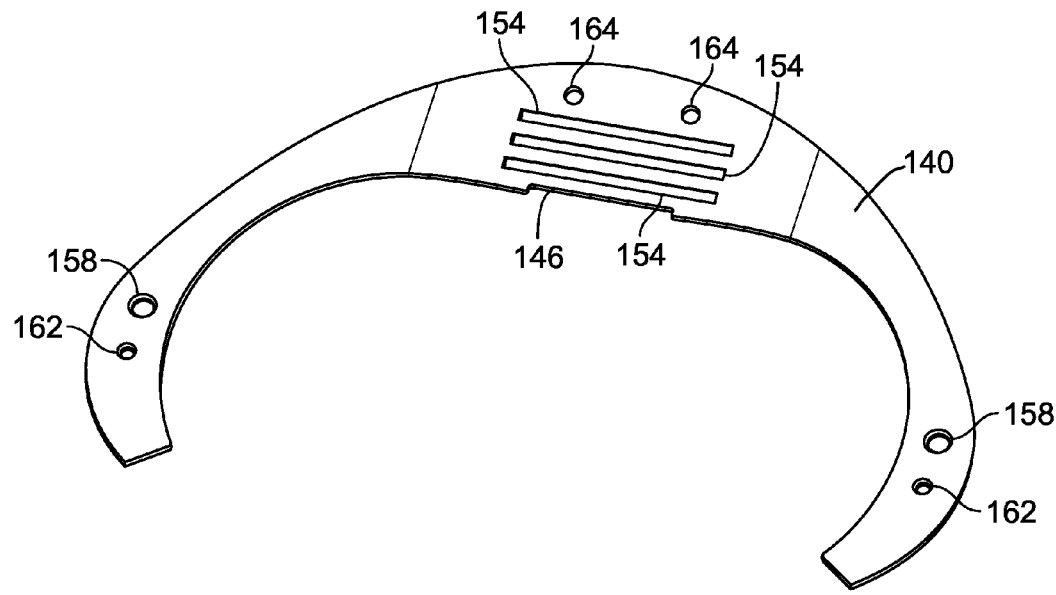
FIG. 25 shows the cover used with the tray of FIG. 22.
Figure 26:
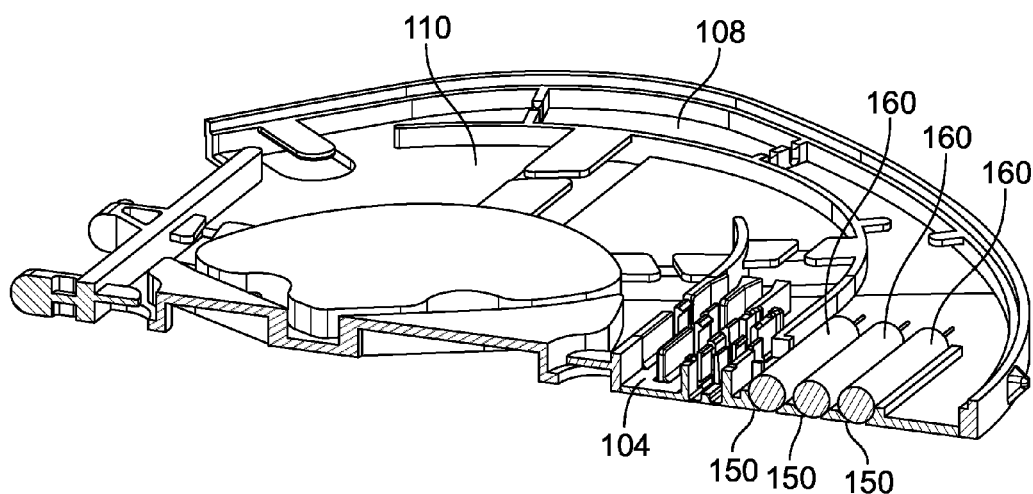
FIG. 26 is a cross-sectional side view showing the filters in the tray, without the cover.
Figure 27:
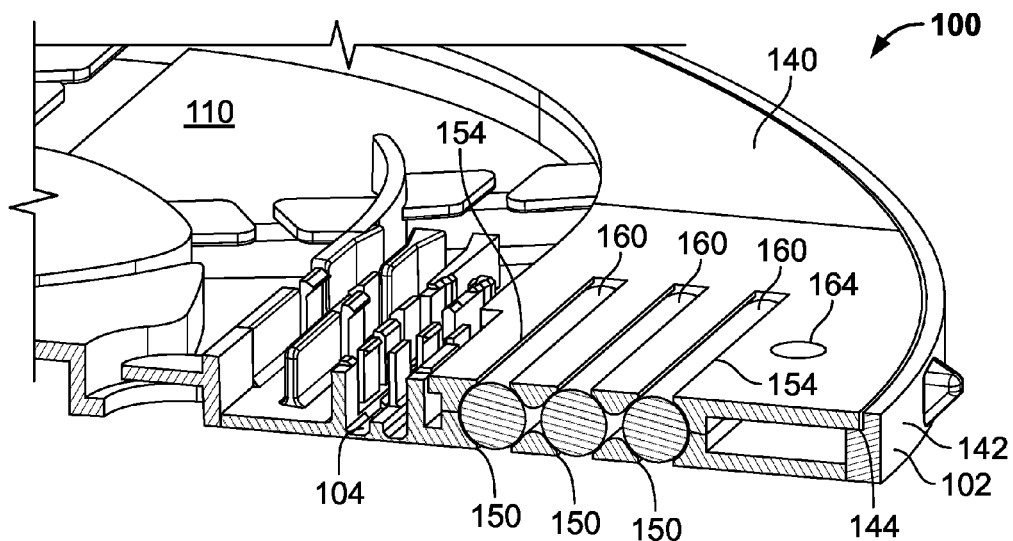
FIG. 27 shows in cross-sectional view in greater detail the tray, the filters, and the cover.
Figure 28:
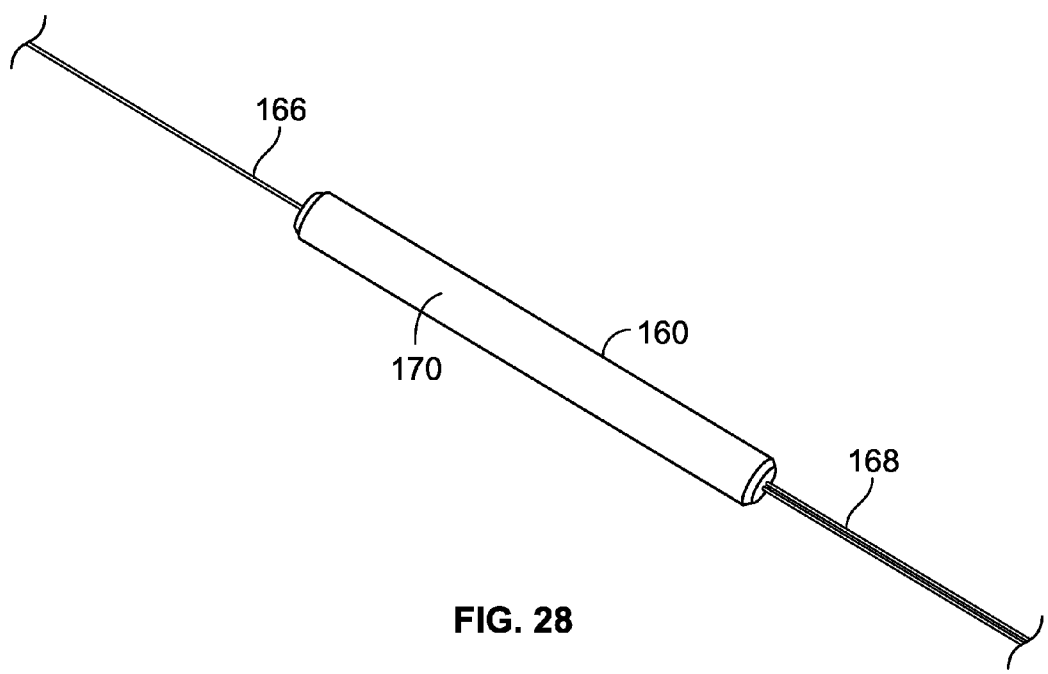
FIG. 28 shows the filter as one example filter usable in the tray of FIGS. 22-27.
Figure 29:
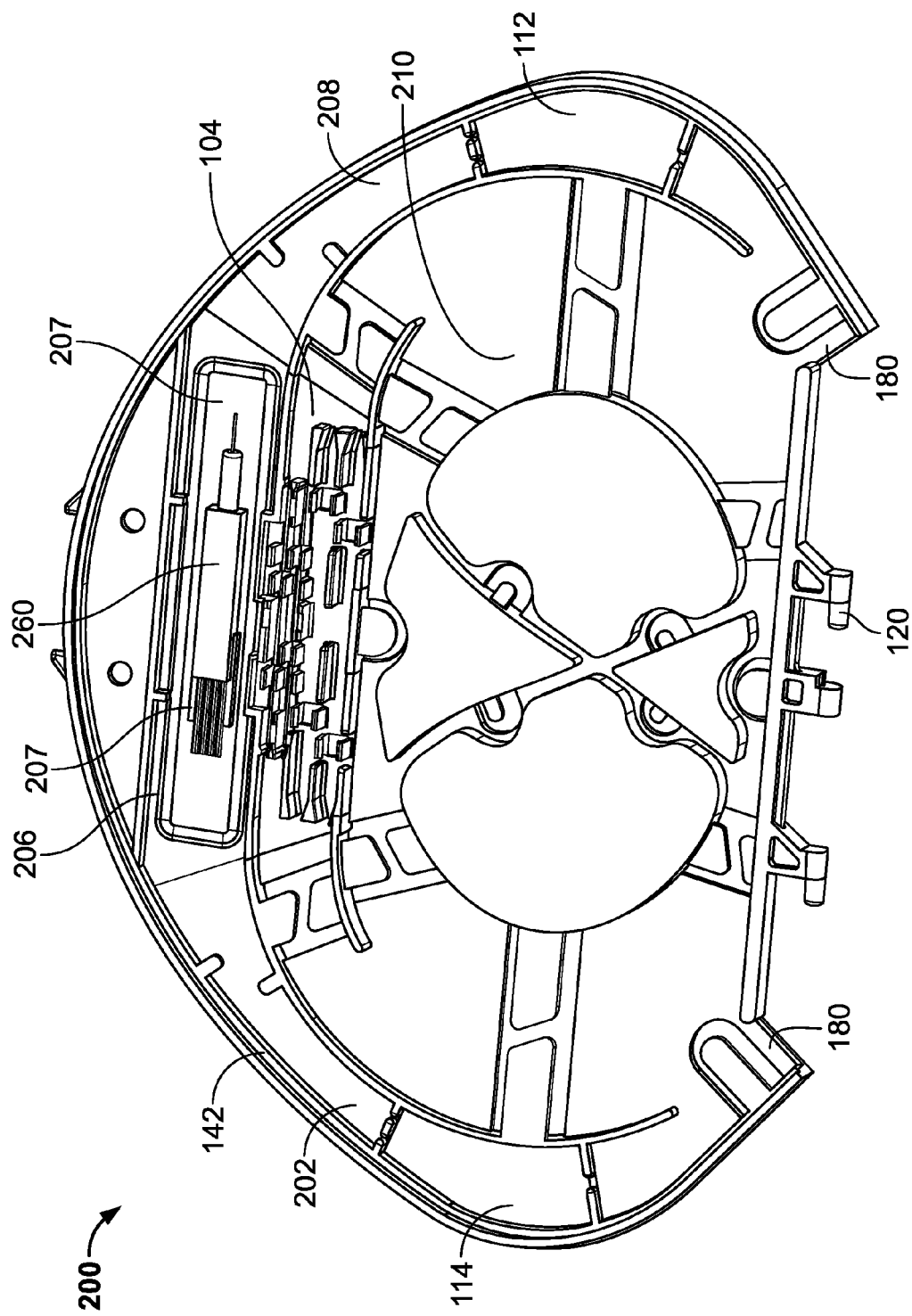
FIG. 29 is a top perspective view of an embodiment of a splitter tray, shown without the cover.
Figure 30:
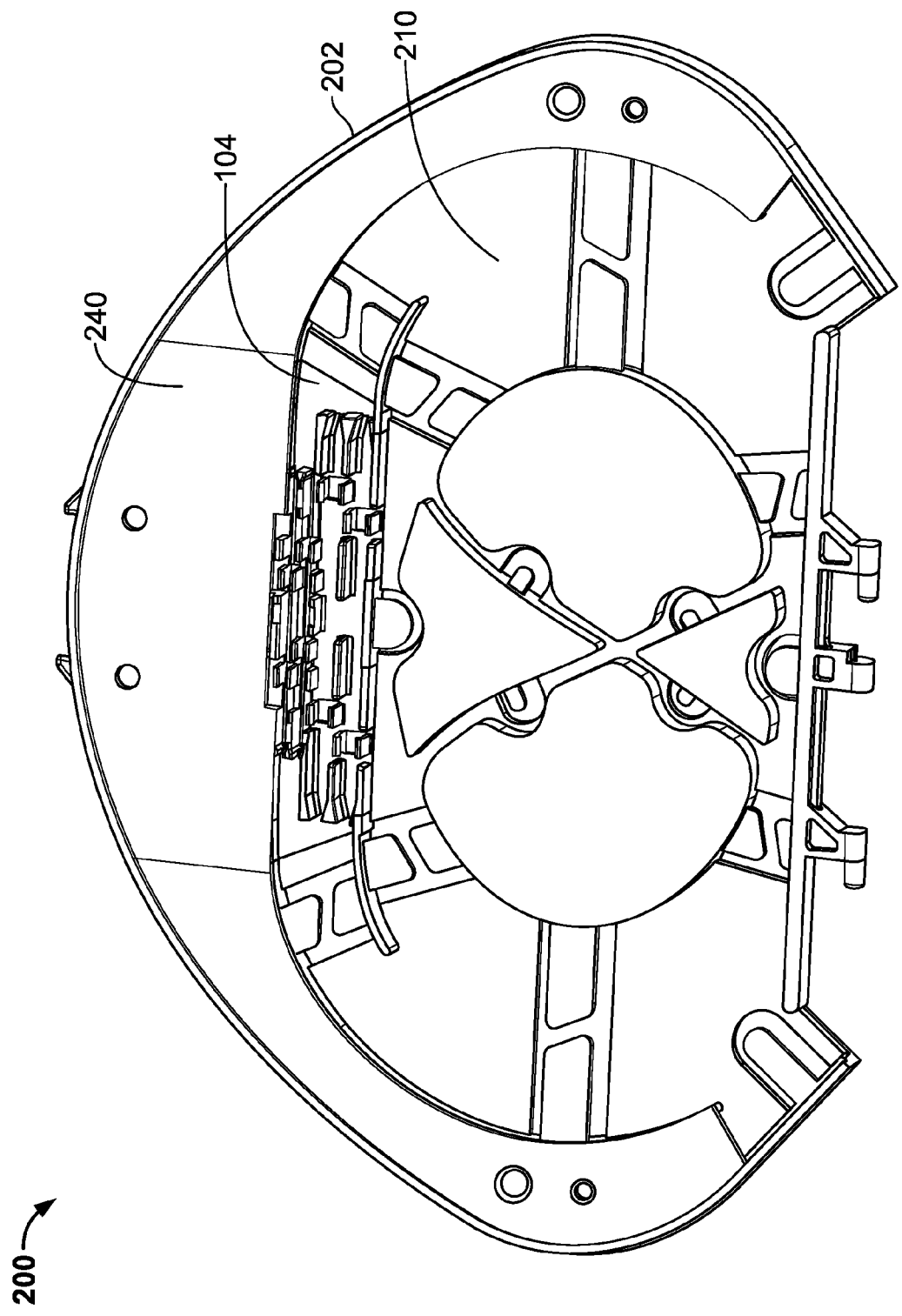
FIG. 30 shows the tray of FIG. 29 including the cover.
Figure 31:
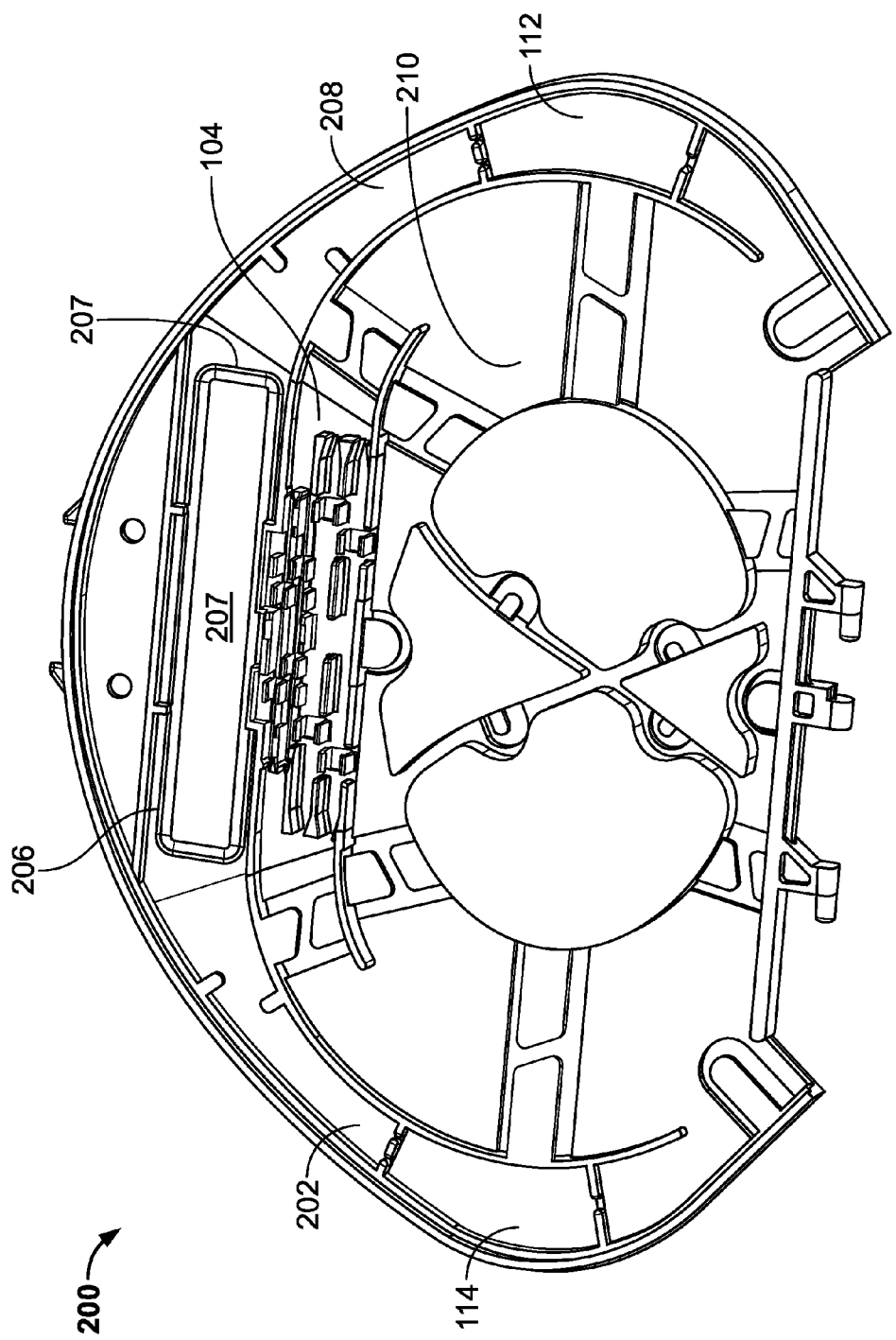
FIG. 31 shows the tray of FIG. 29 without the splitter.
Figure 32:
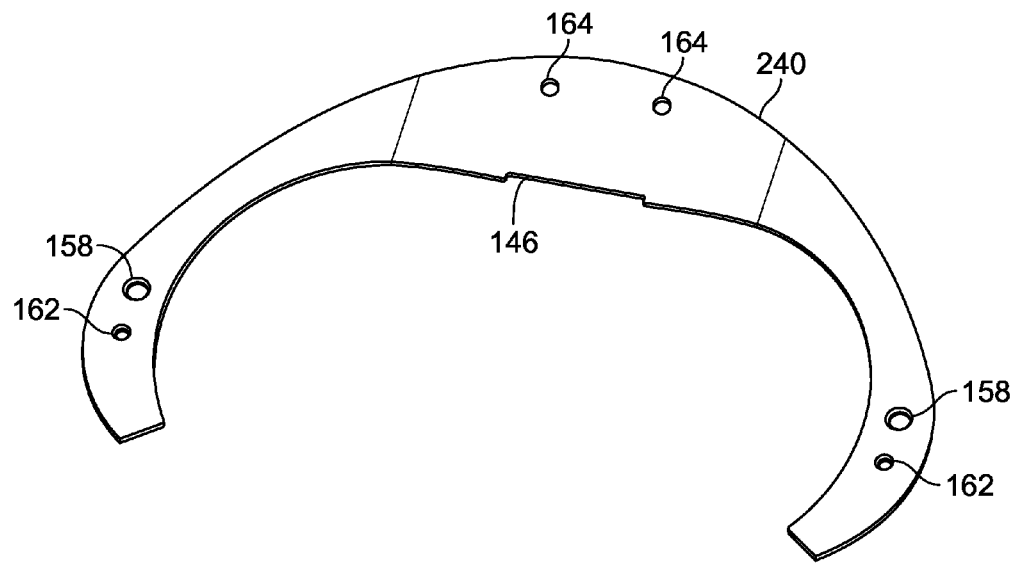
FIG. 32 shows the cover used with the tray of FIG. 29.
Figure 33:
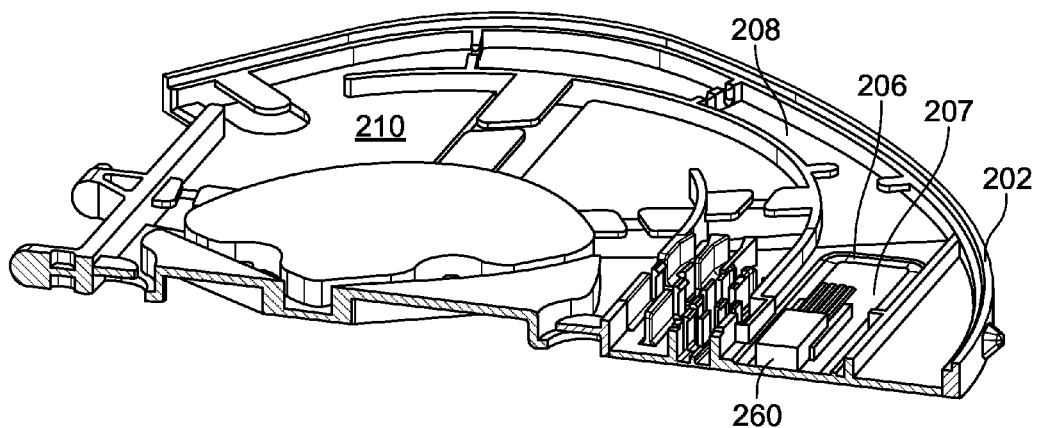
FIG. 33 is a cross-sectional side view showing the splitter in the tray, without the cover.
Figure 34:
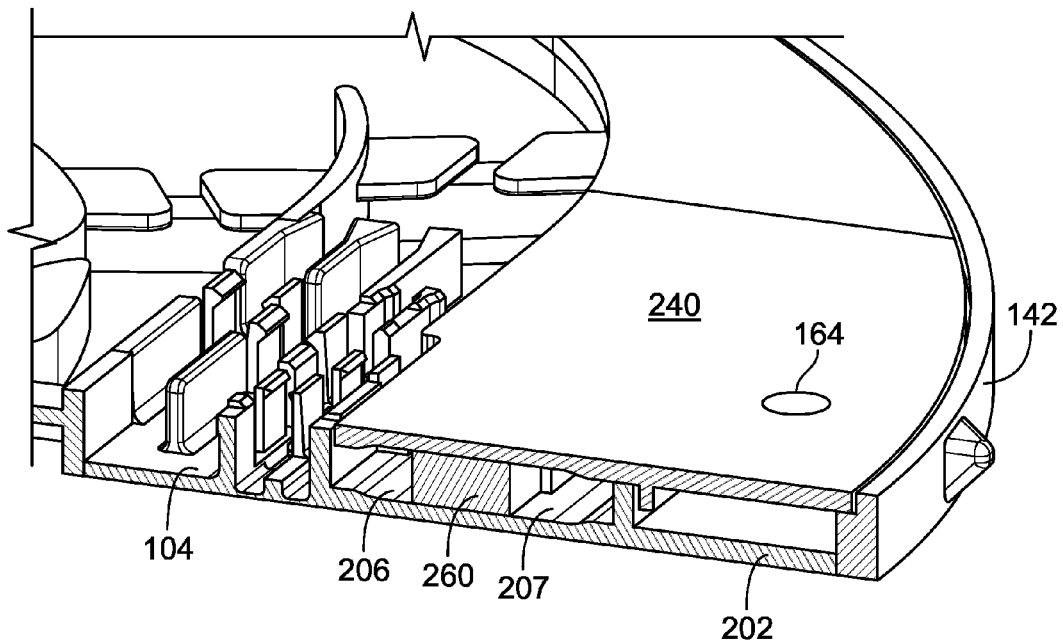
FIG. 34 shows in cross-sectional view in greater detail the tray, the splitter, and the cover.
Figure 35:
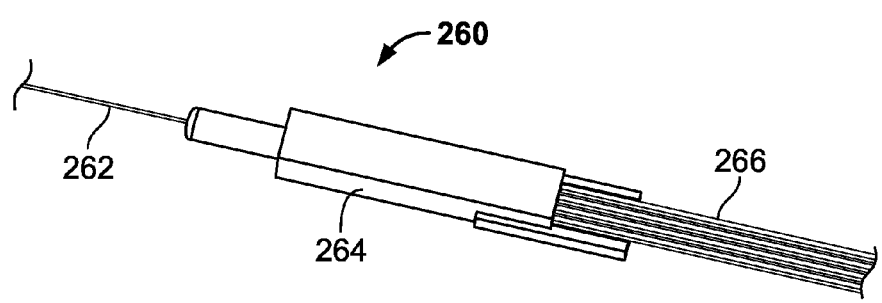
FIG. 35 shows the splitter as one example splitter usable in the tray of FIGS. 29-34.
Figure 36:
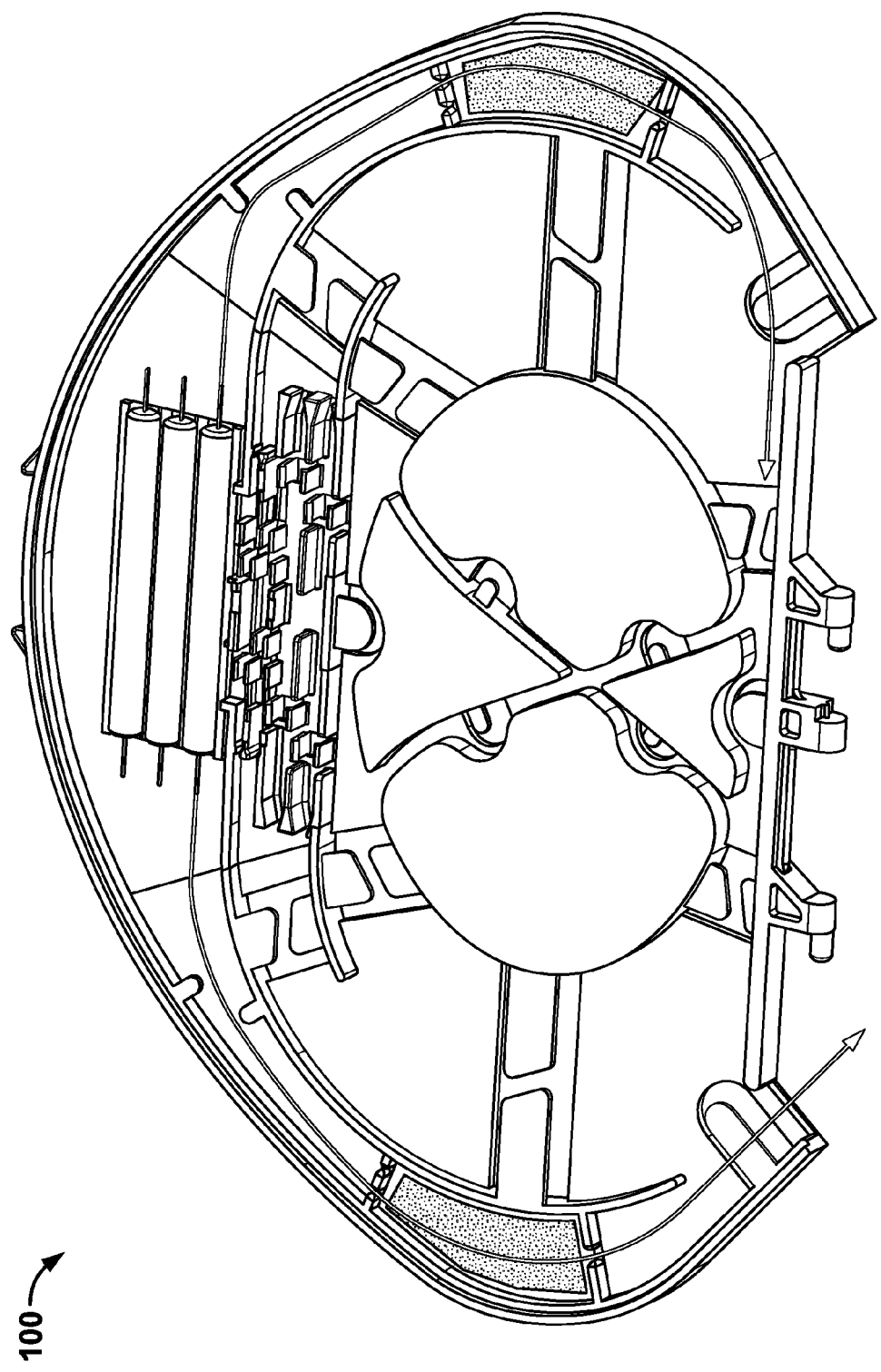
FIGS. 36-39 show various routings of the input and output fibers to the trays of FIGS. 22-35.
Figure 37:
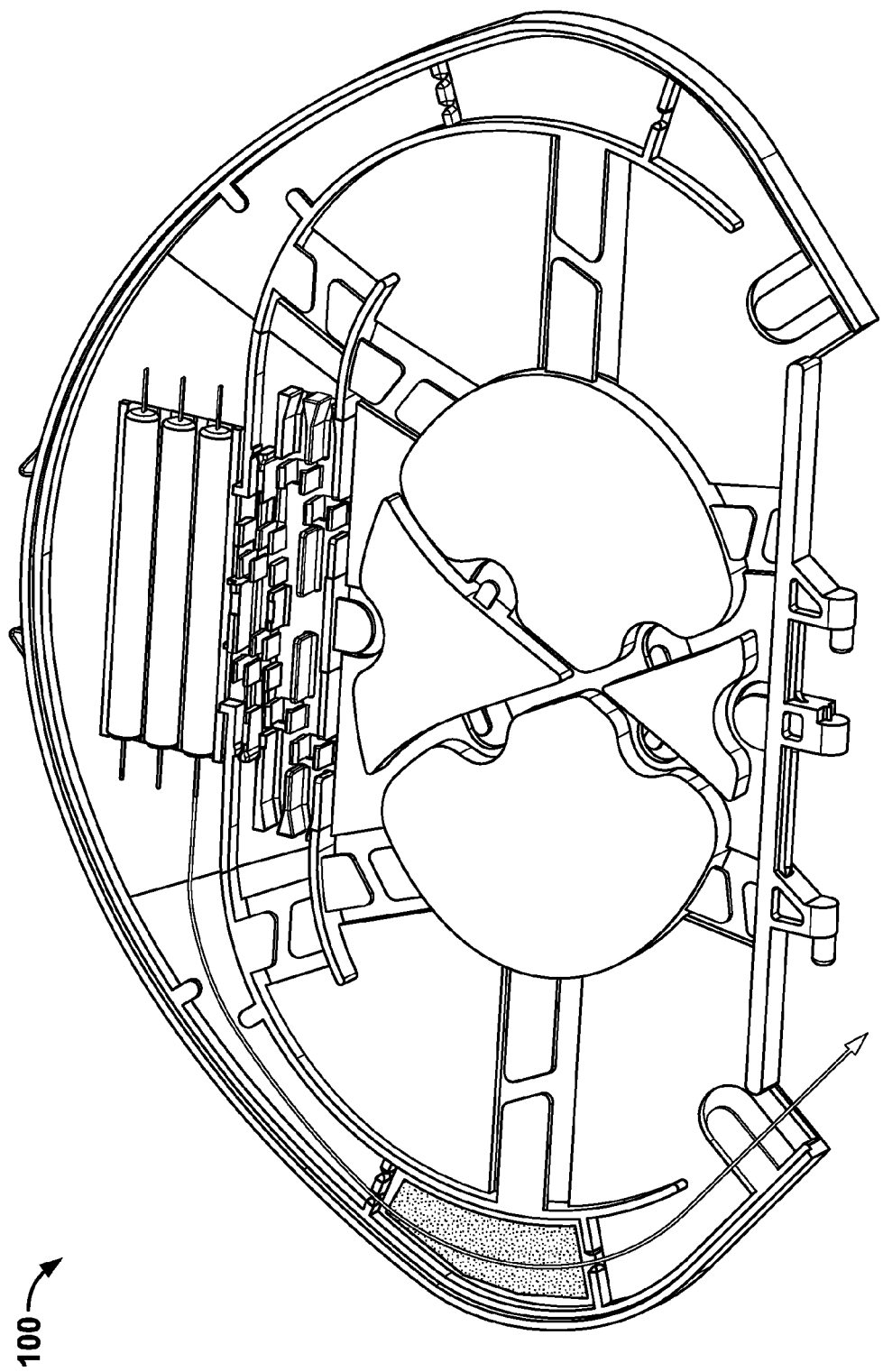
Figure 38:
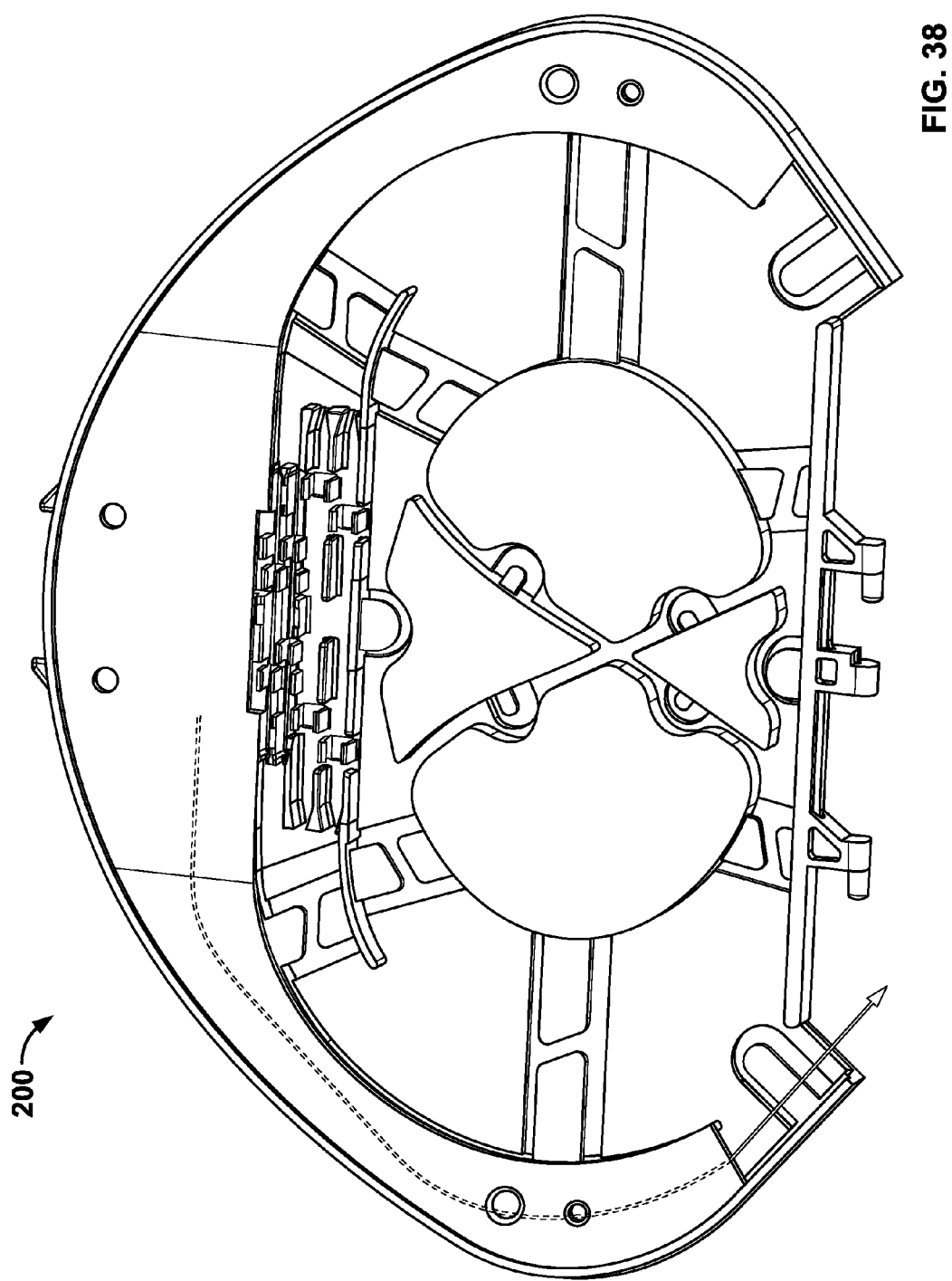
Figure 39:
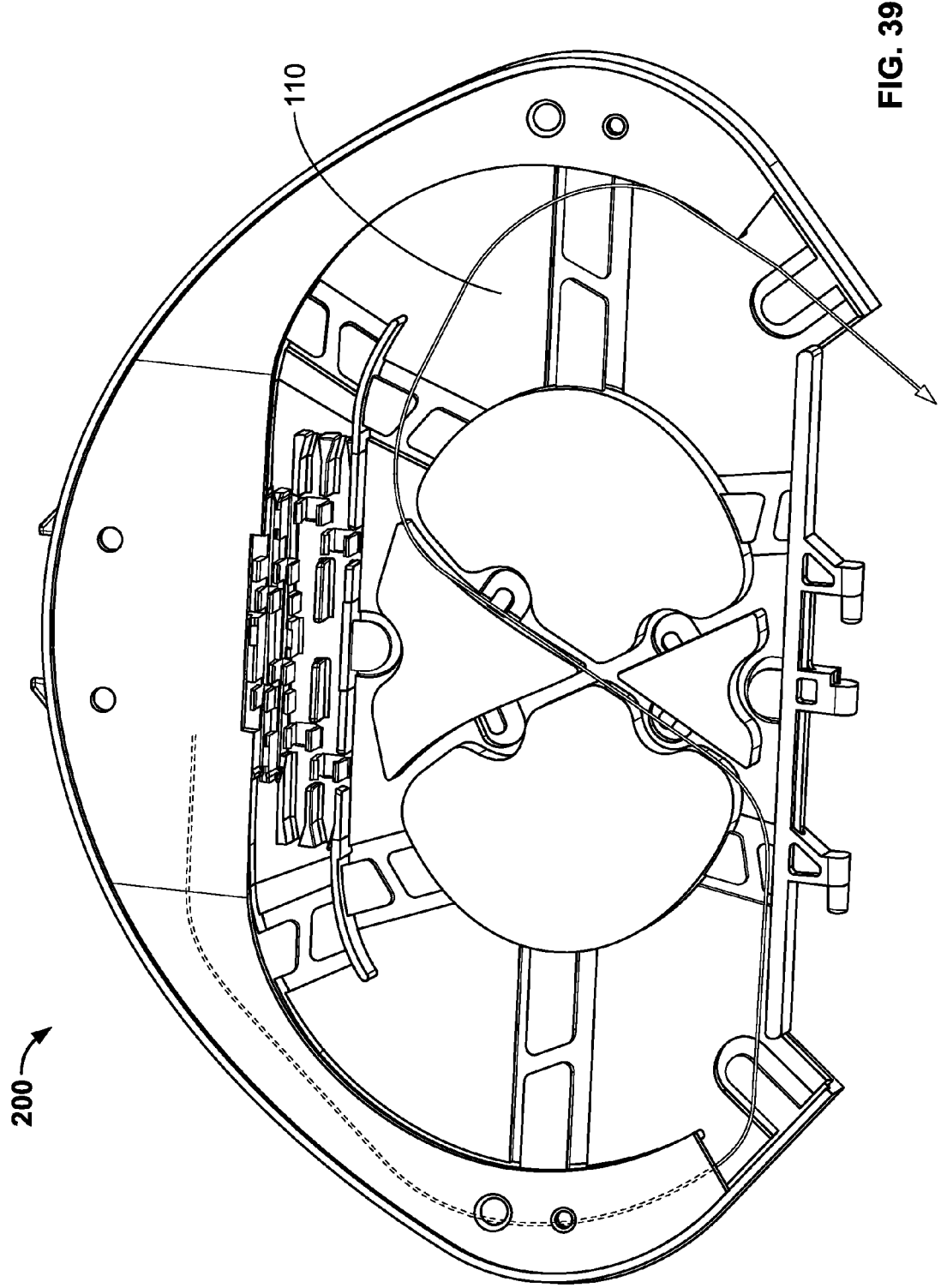

FIG. 20 shows the routing of fiber from a fiber splice on splice tray 16 with the splice output shown as fiber FO. FIG. 21 shows a rear of support plate 12.

The organizer 10 allows for a variety of fiber and cable routing options for the inputs and the outputs of splitter trays 18 and the inputs and outputs of splice trays 16. A user can enter and exit from different sides, the opposite different sides, the same side or the opposite side.

In one implementation, the splice trays 16 and the splitter tray 18 are the same thickness. In one example, the trays are four millimeters thick.

In the example shown, there are eight splice trays 16, and one splitter tray 18 on support plate 12.

By creating splitter mounting locations 40 in the form of openings through the cover 32 and the base 34, a thinner splitter tray 18 is created.

By affixing cover 32 to base 34 after assembly, a technician is provided with limited access to the splitter 88 and the splitter inputs and outputs, except as they enter and exit the tray.

Cable management devices 20, 42, 64, rim 62 and the various entrances and exits can be provided with appropriate curves or other structures to manage the cables. Fingers, bend radius limiting shapes, and S-bend devices can be provided.

Referring now to FIGS. 22-28, a filter tray 100 is shown. Tray 100 includes a base 102 a splice holder area 104 and a filter holder area 106. Cable routing areas include an outer routing area 108 and an inner routing area 110. Outer routing area 108 includes glue areas 112, 114 for fiber retention. Tray 100 defines hinge elements 120. Tray includes a cover 140 which is sized to fit over filter holder area 106 and outer routing area 108. As shown, cover 140 leaves inner routing area 110 exposed to help reduce the thickness of tray 10. Slots 150 are provided in base 102 of tray 100. Further slots 154 are provided in cover 140. As illustrated, three filters 160 are shown in filter tray 100.

Base 102 includes a notch 144 on outer rim 142 for receipt of cover 140. This feature helps reduce the profile or height. Cover 140 also includes an inner notch 146 for receipt of a portion 156 of tray base 102.

Cover 140 includes openings 158 for filing glue areas 112, 114. Vent openings 162 are provided in cover 140 to allow for air venting during gluing. Cover 140 also includes openings 164 to apply glue and/or for venting in the filter area. Cover 140 is glued to base 102 and is not removable.

Splice holder area 104 can be used as desired. One use is for splicing to the incoming fibers.

Filter 160 is one example component. Others are possible. Filter 160 has a one fiber (pass) 166, and two fibers (common-reflect) 168. Tubular housing 170 is 3.8 mm in diameter in one example. Tray 100 is approximately 4.0 mm thick, in the illustrated example.

Referring now to FIGS. 29-35, a splitter tray 200 is shown with similar features to filter tray 100. Tray 200 has a base 202. A splitter holder area 206 is shown with a pocket 207 for holding a splitter 260. Splitter 260 is a splitter of a known type, with the outer housing removed to reduce its profile. In a similar manner, cover 240 covers outer routing area 208 leaving inner routing area 210 exposed. Cover 240 is glued to base 202 and is not removable.

Splitter 260 includes an input fiber 262, a chip 264 for splitting, and output fibers 266. Chip 264 has a reduced profile due to the removal of the outer housing traditionally positioned around a splitter. If desired, splitter 260 can be glued into pocket 207.

Both of trays 100, 200 include fiber access entrances/exits 180 for use as desired by the installing technician.

As shown in FIGS. 36-39, various cable routing pathways are provided which are applicable to both the filter tray 100 and the splitter tray 200. The glue areas 112, 114 can be used for fiber retention.

PARTS LIST

10 Organizer
12 Support Plate
14 Trays
16 Splice Trays
18 Splitter Tray
20 Cable Management Devices
22 Splice Holders
24 Entrances/exits
32 Cover
34 Base
36 Snaps
40 Splitter Mounting Locations
42 Cable Management Devices
44 Splice Holder 46 Entrances/exits
60 Lower Support
62 Rim
64 Cable Management Devices
66 Entrances/exits
68 Glue Areas
70 Hinge Elements
76 Ribs
78 Openings
80 Glue areas
88 Splitters
90 Openings
92 Cover
100 Filter tray
102 Base
104 Splice holder area
106 Filter holder area
108 Outer routing area
110 Inner routing area
112 Glue area
114 Glue area
120 Hinge elements
140 Cover
142 Rim
144 Notch
146 Inner notch
150 Slots
154 Slots
156 Portion
158 Openings
160 Filters
162 Vent openings
164 Openings
166 Fiber (pass)
168 Fibers (common-reflect)
170 Tubular housing
180 Entrances/exits
200 Splitter tray
202 Base
206 Splitter holder area
207 Pocket
208 Outer routing area
210 Inner routing area
240 Cover
260 Splitter
262 Input fiber
264 Chip
266 Output fibers

The invention claimed is:

1. A tray comprising:
a tray base;
a tray cover mounted to the tray base;
a snap arrangement for connecting the tray base to the tray cover;
a hinge area for hinging the tray to an organizer;
wherein the tray base and the tray cover each define an opening therethrough for a splitter or filter;
wherein the tray base includes cable management devices for one or more input fibers or cables of the splitter or filter and one or more output fibers or cables of the splitter or filter;
wherein the tray cover includes cable management devices for managing the one or more input fibers or cables to the tray base and splices.

2. The tray of claim 1, further comprising a splitter or filter.

3. The tray of claim 1, further comprising two splitters or filters, positioned in a side by side arrangement.

4. The tray of claim 2, further comprising an adhesive and/or a potting agent for holding each splitter or filter to the tray base.

5. The tray of claim 1, further comprising a support plate, and a plurality of separate splice trays.

6. The tray of claim 1, further comprising cable management devices for managing the fibers and cables on the tray or filter and/or splice trays.

7. The tray of claim 1, further comprising an adhesive and/or a potting agent for affixing each fiber or cable to an entrance or exit of one of the trays.

8. A method of using the tray of claim 1 comprising:
mounting a splitter or filter to the tray base;
gluing the one or more input fibers or cables to the tray base;
gluing the one or more output fibers or cables to the tray base;
mounting the tray cover to the tray base;
gluing the splitter or filter in place.

9. The method of claim 8 comprising:
passing the one or more output fibers or cables through an opening in a support plate; and separating the one or more output fibers or cables into separate openings to pass the output fibers or cables back through the support plate for placement on a splice tray.

10. The tray of claim 1, wherein a height of the tray including any cover is approximately 4 mm or less.

11. The tray of claim 1, wherein a height of the tray including any cover is approximately equal to 4 mm.

12. The tray of claim 1, wherein a height of the tray including any cover is equal to 4 mm.

13. A tray comprising:
a tray base;
a tray cover mounted to the base;
a hinge area for hinging the tray to an organizer;
wherein the tray base and the tray cover define an opening therethrough for a splitter or a filter;
wherein the tray base includes cable management devices for managing one or more input fibers or cables of the splitter or the filter and one or more output fibers or cables of the splitter or the filter;
wherein the tray cover covers at least a portion of the tray base including the one or more input fibers or cables and/or the one or more output fibers or cables of the splitter or the filter.

14. The tray of claim 13, further comprising an adhesive and/or a potting agent for affixing each fiber or cable to an entrance or exit of the tray.

15. The tray of claim 13, wherein the cover is snapped and/or glued to the base.

16. The tray of claim 13, wherein the splitter has an outer housing, the outer housing removed to be mounted to the opening.

17. A method of using the tray of claim 13 comprising:
mounting a splitter or filter to tray base;
gluing the one or more input fibers or cables to the tray;
gluing the one or more output fibers or cables to the tray;
mounting the tray cover to the tray base, wherein the splitter or the filter is positioned in the opening in the tray base and/or the tray cover.

18. The tray of claim 13, further comprising an adhesive and/or a potting agent for holding each splitter or filter to the tray.

19. A cable management system comprising:
a support plate;

a plurality of splice trays pivotally mounted to the support plate; and a tray according to claim 13 and pivotally mounted to the support plate.

20. The cable management system of claim 19, wherein:

the one or more output fibers or cables are passed through an opening in the support plate, and separated into separate openings to pass the one or more output fibers or cables back through the support plate for placement on at least one of the splice trays.

* * * * *